United States Patent [19]

Jacoby

[11] 4,323,931
[45] Apr. 6, 1982

[54] METHOD AND APPARATUS FOR ENCODING AND RECOVERING BINARY DIGITAL DATA

[75] Inventor: George V. Jacoby, Los Altos, Calif.

[73] Assignee: Sperry Corporation, New York, N.Y.

[21] Appl. No.: 165,562

[22] Filed: Jul. 3, 1980

Related U.S. Application Data

[63] Continuation-in-part of Ser. No. 705,199, Jul. 14, 1976.

[51] Int. Cl.³ .............................................. G11B 5/09
[52] U.S. Cl. ........................................ 360/40; 360/44
[58] Field of Search ....................... 360/40, 44, 45, 51; 340/370 DD

[56] References Cited

U.S. PATENT DOCUMENTS

| | | | |
|---|---|---|---|
| 3,226,685 | 12/1965 | Porter et al. | 360/45 |
| 3,374,475 | 3/1968 | Gabor | 360/45 |
| 3,377,583 | 4/1968 | Sims, Jr. | 360/44 |
| 3,643,228 | 2/1972 | Lipp | 360/45 |
| 3,685,033 | 8/1972 | Srivastava | 360/45 |
| 3,792,454 | 2/1974 | Lipp | 360/44 |
| 4,000,512 | 12/1976 | Lau | 360/44 |
| 4,005,478 | 1/1977 | Beinhauer | 360/40 |

Primary Examiner—Vincent P. Canney

Attorney, Agent, or Firm—Eugene T. Battjer; Thomas H. Olson; Marshall M. Truex

[57] ABSTRACT

A binary data encoding and recovery technique for which the encoding is carried out by separating the binary data into successive data words each containing an equivalent number of data bits, generating one or more code signals representative of each data word where each code signal corresponds to a signal change at one of a plurality of signal change positions in a data cell associated with the data word and is spaced from adjacent signal changes in the data cell by at least a prescribed minimum amount, and assuring that succeeding signal changes occurring in a sequence of data cells are spaced at least the prescribed minimum amount by determining whether a signal change in one data cell would be spaced less than the prescribed minimum amount from a signal change in an adjacent data cell and in such event providing for the code signals related to such signal changes to be merged into a code signal corresponding to a signal change positioned at the boundary of the adjacent data cells so that the prescribed minimum spacing is maintained between all signal changes. In certain instances, additional signal changes are inserted at strategic locations to limit the distance between successive signal changes.

40 Claims, 17 Drawing Figures

PROPERTIES OF PRIOR ART CODES FOR DATA BIT RATE = $\frac{1}{T}$

| CODE | L | N | S MIN | S MAX | S MAX : S MIN | DATA BITS PER S MIN | RECOVERY WINDOW | CLOCK RATE |
|---|---|---|---|---|---|---|---|---|
| NRZI | 1 | 1 | T | UNLIMITED | ∞ | 1 | ±0.5T | NO CLOCK |
| FM | 1 | 2 | $\frac{T}{2}$ | T | 2:1 | 0.5 | ±0.25T | $\frac{2}{T}$ |
| GABOR | 2 | 3 | $\frac{2T}{3}$ | $\frac{4T}{3}$ | 2:1 | 0.66 | ±0.33T | $\frac{3}{2} \cdot \frac{1}{T}$ |
| MFM | 1 | 2 | T | 2T | 2:1 | 1 | ±0.25T | $\frac{2}{T}$ |

EXPLANATION:  L = NUMBER OF DATA BITS ENCODED IN N POSITIONS
T = DURATION OF ONE DATA BIT
S MIN = MINIMUM DISTANCE BETWEEN TRANSITIONS
S MAX = MAXIMUM DISTANCE BETWEEN TRANSITIONS

FIG. 2

PROPERTIES OF SUBJECT CODE FOR DATA BIT RATE = $\frac{1}{T}$

| CODE | L | N | S MIN | S MAX | S MAX : S MIN | DATA BITS PER S MIN | RECOVERY WINDOW | CLOCK RATE |
|---|---|---|---|---|---|---|---|---|
| 3PM | 3 | 6 | $\frac{3T}{2}$ | 6T | 4:1 | 1.5 | ±0.25T | $\frac{2}{T}$ |

FIG. 3

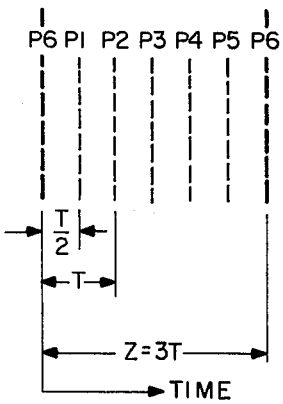
FIG.4
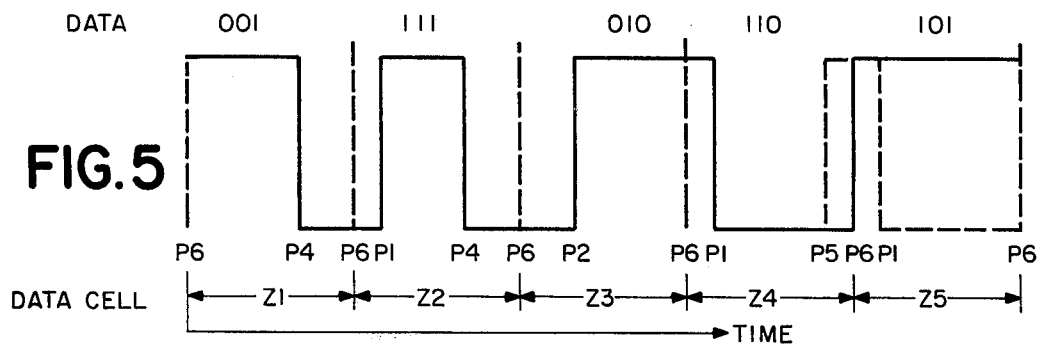
FIG.5
DECODING TRUTH TABLE
| SERIAL NUMBER OF COMBINATION | TRANSITION POSITIONS IN DATA CELL P6' P1 P2 P3 P4 P5 P6 | OCTAL | BINARY DATA WORD D2 D1 D0 |
|---|---|---|---|
| 1 | 0 0 0 0 0 1 0 | 0 | 0 0 0 |
| 2 | 0 0 0 0 0 0 1 | 0 | 0 0 0 |
| 3 | 0 0 0 0 1 0 0 | 1 | 0 0 1 |
| 4 | 0 0 1 0 0 0 0 | 2 | 0 1 0 |
| 5 | 0 0 1 0 0 1 0 | 3 | 0 1 1 |
| 6 | 0 0 1 0 0 0 1 | 3 | 0 1 1 |
| 7 | 0 0 0 1 0 0 0 | 4 | 1 0 0 |
| 8 | 0 1 0 0 0 0 0 | 5 | 1 0 1 |
| 9 | 1 0 0 0 0 0 0 | 5 | 1 0 1 |
| 10 | 0 1 0 0 0 1 0 | 6 | 1 1 0 |
| 11 | 1 0 0 0 0 1 0 | 6 | 1 1 0 |
| 12 | 0 1 0 0 0 0 1 | 6 | 1 1 0 |
| 13 | 1 0 0 0 0 0 1 | 6 | 1 1 0 |
| 14 | 0 1 0 0 1 0 0 | 7 | 1 1 1 |
| 15 | 1 0 0 0 1 0 0 | 7 | 1 1 1 |
FIG.10

TRUTH TABLE WITHOUT MERGING

| SERIAL NUMBER OF COMBINATION | OCTAL | BINARY DATA WORD | | | ENCODER OUTPUT | TRANSITION POSITIONS IN DATA CELL | | | | | |
|---|---|---|---|---|---|---|---|---|---|---|---|
| | | | | | | P1 | P2 | P3 | P4 | P5 | P6 |
| 1 | 0 | 0 | 0 | 0 | B0 | 0 | 0 | 0 | 0 | 1 | 0 |
| 2 | 1 | 0 | 0 | 1 | B1 | 0 | 0 | 0 | 1 | 0 | 0 |
| 3 | 2 | 0 | 1 | 0 | B2 | 0 | 1 | 0 | 0 | 0 | 0 |
| 4 | 3 | 0 | 1 | 1 | B3 | 0 | 1 | 0 | 0 | 1 | 0 |
| 5 | 4 | 1 | 0 | 0 | B4 | 0 | 0 | 1 | 0 | 0 | 0 |
| 6 | 5 | 1 | 0 | 1 | B5 | 1 | 0 | 0 | 0 | 0 | 0 |
| 7 | 6 | 1 | 1 | 0 | B6 | 1 | 0 | 0 | 0 | 1 | 0 |
| 8 | 7 | 1 | 1 | 1 | B7 | 1 | 0 | 0 | 1 | 0 | 0 |

FIG. 7

TRUTH TABLE WITH MERGING

| SERIAL NUMBER OF COMBINATION | OCTAL | BINARY DATA WORD | | | LOGIC OUTPUTS | INFLUENCE OF ADJACENT WORDS | | TRANSITION POSITIONS IN DATA CELL | | | | | |
|---|---|---|---|---|---|---|---|---|---|---|---|---|---|
| | | | | | | PRECEDING | FOLLOWING | P1 | P2 | P3 | P4 | P5 | P6 |
| 1 | 0 | 0 | 0 | 0 | B0·$\bar{C}$ | X | 0 | 0 | 0 | 0 | 0 | 1 | 0 |
| 2 | 0 | 0 | 0 | 0 | B0·C | X | 1 | 0 | 0 | 0 | 0 | 0 | 1 |
| 3 | 1 | 0 | 0 | 1 | B1 | X | X | 0 | 0 | 0 | 1 | 0 | 0 |
| 4 | 2 | 0 | 1 | 0 | B2 | X | X | 0 | 1 | 0 | 0 | 0 | 0 |
| 5 | 3 | 0 | 1 | 1 | B3·$\bar{C}$ | X | 0 | 0 | 1 | 0 | 0 | 1 | 0 |
| 6 | 3 | 0 | 1 | 1 | B3·C | X | 1 | 0 | 1 | 0 | 0 | 0 | 1 |
| 7 | 4 | 1 | 0 | 0 | B4 | X | X | 0 | 0 | 1 | 0 | 0 | 0 |
| 8 | 5 | 1 | 0 | 1 | B5·$\bar{A}$ | 0 | X | 1 | 0 | 0 | 0 | 0 | 0 |
| 9 | 5 | 1 | 0 | 1 | B5·A | 1 | X | 0 | 0 | 0 | 0 | 0 | 0 |
| 10 | 6 | 1 | 1 | 0 | B6·$\bar{A}$·$\bar{C}$ | 0 | 0 | 1 | 0 | 0 | 0 | 1 | 0 |
| 11 | 6 | 1 | 1 | 0 | B6·A·$\bar{C}$ | 1 | 0 | 0 | 0 | 0 | 0 | 1 | 0 |
| 12 | 6 | 1 | 1 | 0 | B6·$\bar{A}$·C | 0 | 1 | 1 | 0 | 0 | 0 | 0 | 1 |
| 13 | 6 | 1 | 1 | 0 | B6·A·C | 1 | 1 | 0 | 0 | 0 | 0 | 0 | 1 |
| 14 | 7 | 1 | 1 | 1 | B7·$\bar{A}$ | 0 | X | 1 | 0 | 0 | 1 | 0 | 0 |
| 15 | 7 | 1 | 1 | 1 | B7·A | 1 | X | 0 | 0 | 0 | 1 | 0 | 0 |

PRECEDING: A = A0+A3+A6
FOLLOWING: C = C5+C6+C7

X: DONT CARE

· INDICATES AND
+ INDICATES OR

FIG. 8

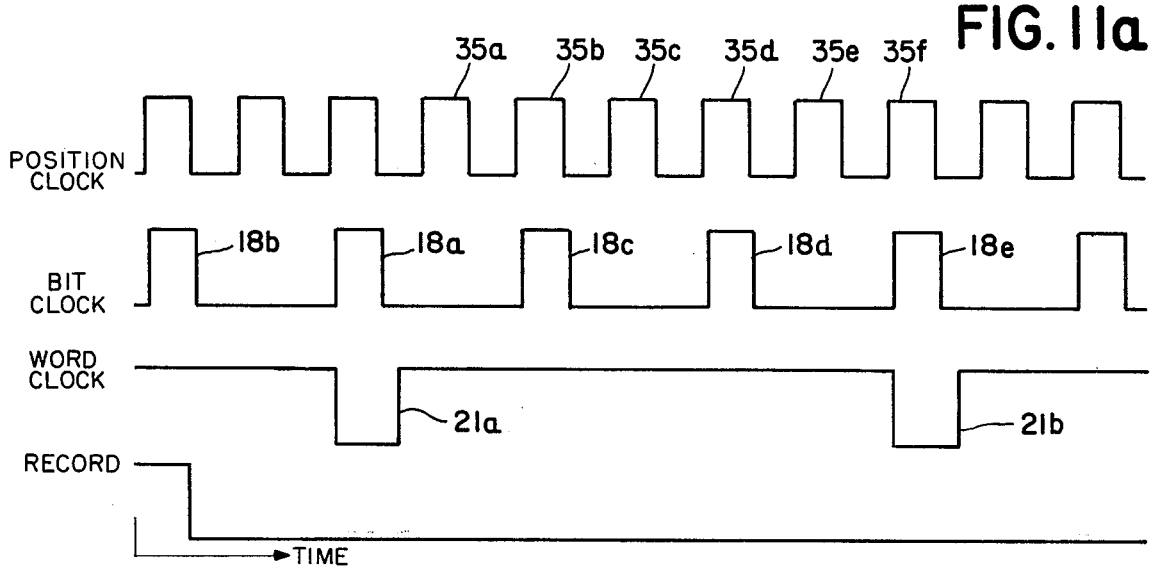
FIG. 11a
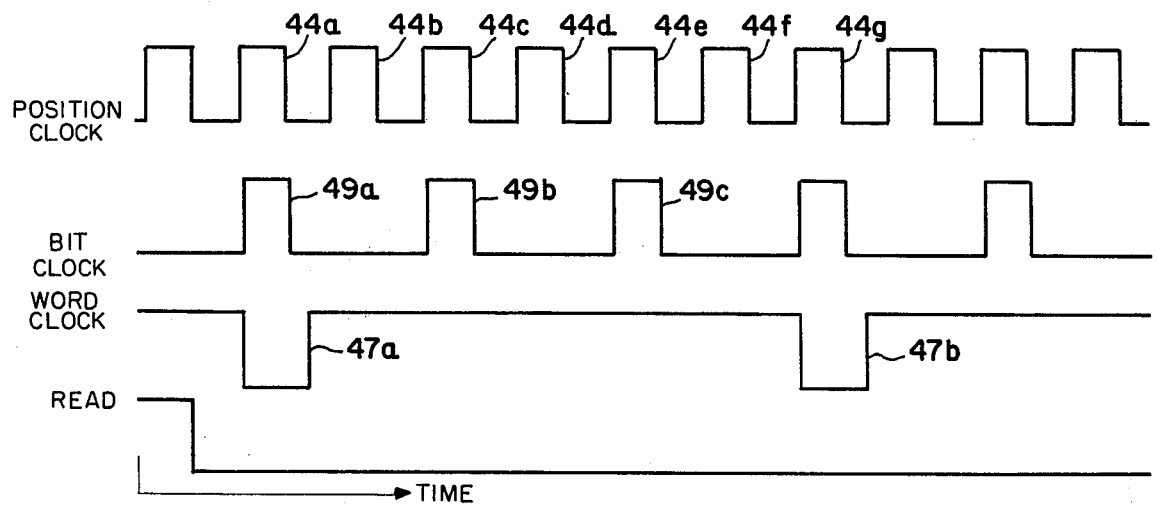
FIG. 11b
FIG. 13
| SERIAL NUMBER OF COMBINATION | OCTAL | BINARY DATA WORD | | | TRANSITION POSITIONS IN DATA CELL | | | | | | |
|---|---|---|---|---|---|---|---|---|---|---|---|
| | | | | | ←CELL 1→ | | | ←CELL 2→ | | | |
| | | | | | P3 | P1 | P2 | P3 | P1 | P2 | P3 |
| 1 | 0 | 0 | 0 | 0 | 0 | 0 | 0 | 0 | 0 | 1 | 0 |
| 2 | 1 | 0 | 0 | 1 | 0 | 0 | 0 | 1 | 0 | 0 | 0 |
| 3 | 2 | 0 | 1 | 0 | 0 | 1 | 0 | 0 | 0 | 0 | 0 |
| 4 | 3 | 0 | 1 | 1 | 0 | 1 | 0 | 0 | 0 | 1 | 0 |
| 5 | 4 | 1 | 0 | 0 | 0 | 1 | 0 | 1 | 0 | 0 | 0 |
| 6 | 5 | 1 | 0 | 1 | 1 | 0 | 0 | 0 | 0 | 0 | 0 |
| 7 | 6 | 1 | 1 | 0 | 1 | 0 | 0 | 0 | 0 | 1 | 0 |
| 8 | 7 | 1 | 1 | 1 | 1 | 0 | 0 | 1 | 0 | 0 | 0 |

TRUTH TABLE FOR
ENCODING WITH MERGER & INSERTION

| SERIAL NUMBER | OCTAL | BINARY WORD | | | LOGIC OUTPUTS | PRE-CEDING | TRANSITION POSITIONS | | | | | | FOLLOWING | | | |
|---|---|---|---|---|---|---|---|---|---|---|---|---|---|---|---|---|
| | | | | | | $P'_6$ | $P_1$ | $P_2$ | $P_3$ | $P_4$ | $P_5$ | $P_6$ | $P''_1$ | $P''_2$ | $P''_3$ | $P''_4$ |
| 1 | 0 | 0 | 0 | 0 | $\overline{A2} \cdot B0 \cdot \overline{C}$ | X | 0 | 0 | 0 | 0 | 1 | 0 | 0 | X | X | X |
| 2 | 0 | 0 | 0 | 0 | $\overline{A2} \cdot B0 \cdot C$ | X | 0 | 0 | 0 | 0 | 0 | 1 | 1 | 0 | 0 | X |
| 2' | 0 | 0 | 0 | 0 | $A2 \cdot B0$ | 1 | 0 | 0 | 1 | 0 | 0 | 0 | X | X | X | X |
| 3 | 1 | 0 | 0 | 1 | $B1$ | X | 0 | 0 | 0 | 1 | 0 | 0 | X | X | X | X |
| 4 | 2 | 0 | 1 | 0 | $B2 \cdot \overline{C0}$ | X | 0 | 1 | 0 | 0 | 0 | 0 | $\overline{0}$ | $\overline{0}$ | $\overline{0}$ | $\overline{0}$ |
| 4' | 2 | 0 | 1 | 0 | $B2 \cdot C0$ | X | 0 | 1 | 0 | 0 | 0 | 1 | 0 | 0 | 0 | 0 |
| 5 | 3 | 0 | 1 | 1 | $B3 \cdot \overline{C}$ | X | 0 | 1 | 0 | 0 | 1 | 0 | 0 | X | X | X |
| 6 | 3 | 0 | 1 | 1 | $B3 \cdot C$ | X | 0 | 1 | 0 | 0 | 0 | 1 | 1 | 0 | 0 | 0 |
| 7 | 4 | 1 | 0 | 0 | $B4$ | X | 0 | 0 | 1 | 0 | 0 | 0 | X | X | X | X |
| 8 | 5 | 1 | 0 | 1 | $\overline{A} \cdot B5 \cdot \overline{C}'$ | 0 | 1 | 0 | 0 | 0 | 0 | 0 | $\overline{0}$ | $\overline{0}$ | X | X |
| 9 | 5 | 1 | 0 | 1 | $A \cdot B5 \cdot \overline{C}'$ | 1 | 0 | 0 | 0 | 0 | 0 | 0 | $\overline{0}$ | $\overline{0}$ | X | X |
| 9' | 5 | 1 | 0 | 1 | $B5 \cdot C'$ | X | 0 | 0 | 1 | 0 | 0 | 1 | 0 | 0 | X | X |
| 10 | 6 | 1 | 1 | 0 | $\overline{A} \cdot B6 \cdot \overline{C}$ | 0 | 1 | 0 | 0 | 0 | 1 | 0 | 0 | X | X | X |
| 11 | 6 | 1 | 1 | 0 | $A \cdot B6 \cdot \overline{C}$ | 1 | 0 | 0 | 0 | 0 | 1 | 0 | 0 | X | X | X |
| 12 | 6 | 1 | 1 | 0 | $\overline{A} \cdot B6 \cdot C$ | 0 | 1 | 0 | 0 | 0 | 0 | 1 | 1 | 0 | 0 | X |
| 13 | 6 | 1 | 1 | 0 | $A \cdot B6 \cdot C$ | 1 | 0 | 0 | 0 | 0 | 0 | 1 | 1 | 0 | 0 | X |
| 14 | 7 | 1 | 1 | 1 | $\overline{A} \cdot B7$ | 0 | 1 | 0 | 0 | 1 | 0 | 0 | X | X | X | X |
| 15 | 7 | 1 | 1 | 1 | $A \cdot B7$ | 1 | 0 | 0 | 0 | 1 | 0 | 0 | X | X | X | X |

A = A0 + A3 + A6  
C = C5 + C6 + C7  
C' = C0 + C1 + C4

X INDICATES DON'T CARE  
• INDICATES AND  
+ INDICATES OR

FIG. 15

TRUTH TABLE FOR ENCODING WITH MERGER & INSERTION

| SERIAL NUMBER | TRANSITION POSITIONS IN DATA CELL ||||||||  | OCTAL | BINARY DATA WORD |||
|---|---|---|---|---|---|---|---|---|---|---|---|---|
| | PRE-CEDING | PRESENT |||||| FOL-LOWING | | | | |
| | $P'_6$ | $P_1$ | $P_2$ | $P_3$ | $P_4$ | $P_5$ | $P_6$ | $P''_3$ | | D2 | D1 | D0 |
| 1  | 0 | 0 | 0 | 0 | 0 | 1 | 0 | X | 0 | 0 | 0 | 0 |
| 2  | 0 | 0 | 0 | 0 | 0 | 0 | 1 | X | 0 | 0 | 0 | 0 |
| 3  | 0 | 0 | 0 | 0 | 1 | 0 | 0 | X | 1 | 0 | 0 | 1 |
| 4  | 0 | 0 | 1 | 0 | 0 | 0 | 0 | X | 2 | 0 | 1 | 0 |
| 5  | 0 | 0 | 1 | 0 | 0 | 1 | 0 | X | 3 | 0 | 1 | 1 |
| 6  | 0 | 0 | 1 | 0 | 0 | 0 | 1 | X | 3 | 0 | 1 | 1 |
| 7  | 0 | 0 | 0 | 1 | 0 | 0 | 0 | X | 4 | 1 | 0 | 0 |
| 8  | 0 | 1 | 0 | 0 | 0 | 0 | 0 | X | 5 | 1 | 0 | 1 |
| 9  | 1 | 0 | 0 | 0 | 0 | 0 | 0 | X | 5 | 1 | 0 | 1 |
| 10 | 0 | 1 | 0 | 0 | 0 | 1 | 0 | X | 6 | 1 | 1 | 0 |
| 11 | 1 | 0 | 0 | 0 | 0 | 1 | 0 | X | 6 | 1 | 1 | 0 |
| 12 | 0 | 1 | 0 | 0 | 0 | 0 | 1 | X | 6 | 1 | 1 | 0 |
| 13 | 1 | 0 | 0 | 0 | 0 | 0 | 1 | X | 6 | 1 | 1 | 0 |
| 14 | 0 | 1 | 0 | 0 | 1 | 0 | 0 | X | 7 | 1 | 1 | 1 |
| 15 | 1 | 0 | 0 | 0 | 1 | 0 | 0 | X | 7 | 1 | 1 | 1 |
| 16 | 0 | 0 | 0 | 1 | 0 | 0 | 1 | X | 5 | 1 | 0 | 1 |
| 17 | 0 | 0 | 1 | 0 | 0 | 0 | 1 | 1 | 2 | 0 | 1 | 0 |
| 18 | 1 | 0 | 0 | 1 | 0 | 0 | 0 | X | 0 | 0 | 0 | 0 |

X INDICATES DON'T CARE

FIG. 17

METHOD AND APPARATUS FOR ENCODING AND RECOVERING BINARY DIGITAL DATA

CROSS REFERENCE TO RELATED APPLICATION

This is an continuation-in-part of U.S. application for patent Ser. No. 705,199, filed July 14, 1976.

BACKGROUND OF THE INVENTION

1. Field of the Invention

This invention relates generally to the digital data processing art and more particularly to a new and improved method and apparatus for encoding and recovering binary digital data. The invention is particularly applicable to digital data communication systems and to magnetic storage and retrieval systems, and will be described herein with reference to the latter.

2. Description of the Prior Art

In the course of development of binary data magnetic storage and retrieval systems, it has been of primary interest to increase the system data capacity by packing as much data as possible into a given time interval or length of the recording medium such as a disk or tape. This objective is met by encoding the binary data so as to place or store signal changes or transitions representative of the respective ones and zeros of the binary data as close together as is practical. Various constraints intrinsic to such systems impose a limitation, however, on what is in fact practical, insofar as data packing density is concerned, with respect to accurate recording and reproduction of the data. One such constraint is a phenomenon commonly referred to as bit shift which occurs in the course of reproducing the binary data from the encoded signal recorded on the storage medium. It is characterized by a shifting of the reproduced signal transitions from their nominal locations and is caused by the close proximity of crowding of adjacent transitions recorded on the storage medium. More specifically, bit shifting occurs as a consequence of the interference or interaction of each reproduced signal transition with adjacent reproduced signal transitions when reading the recorded signals from the storage medium. The amount of shift which occurs for each reproduced signal transition is determined by the packing density and the degree of asymmetrical disposition of the transitions adjacent both sides of each reproduced signal transition, with the amount of shift being proportionally greater in accordance with increased packing density and asymmetry of the respective signals.

Bit shift is of considerable concern because it directly relates to the ability to accurately reproduce the binary data as will become apparent from the following comments. When data is to be recorded it is encoded, as previously mentioned and as will be explained subsequently in greater detail, and then applied to the storage medium on a clocked basis so that each signal transition is recorded in a prescribed interval or segment of the storage medium. Recording on a predetermined time basis is essential to enable detection of the respective one and zero data bits when reading from the storage medium for the purpose of reproducing the binary data stream. Typically, a gated oscillator or preferably a phase locked oscillator is employed to create a time oriented window for recovering the binary data from the reproduced signal transitions. The phase locked oscillator, for example, usually functions in a manner, as is well known to those skilled in the art, such that it runs at a nominal frequency which is a selected harmonic of the frequency corresponding to the fundamental period of the encoded data signal and thereby produces a gating window signal associated with each reproduced signal transition for recovering the binary data from the encoded data signal. At this point it should be understood that the recovery window has associated with it a feature commonly referred to as timing tolerance. It will be appreciated that when the signal transitions are packed closer together, the recovery window must be narrowed to preclude detection of a reproduced signal transition at a nonassociated window. Naturally, as the recovery window is narrowed, the amount of bit shift which can be tolerated is reduced proportionally. A phase comparator included in the phase locked oscillator serves to compare the phase of the reproduced signal transitions read from the storage medium with a signal supplied from the phase locked oscillator to produce a signal for controlling the oscillator so as to cause it to track the reproduced signal transitions. A filter circuit of the phase locked oscillator functions to enable the oscillator to track average time locations of the reproduced signal transitions while remaining insensitive to instantaneous variations thereof. In this way, the recovery window is maintained in general alignment with the reproduced signal transitions. In the case of any abrupt bit shift in excess of a predetermined amount, however, the reproduced signal transition will be positioned outside its recovery window with resultant failure of detection and erroneous data recovery.

From the foregoing comments it will be appreciated that bit shift must be reduced to enhance data recovery and that reduction of bit shift in turn is dependent on avoidance of inordinate crowding of adjacent transitions of the encoded data signal. To satisfy such criteria and others which will be discussed subsequently, various encoding techniques have been devised in the development of the art. Some of the desired characteristics of a suitable encoding technique will be discussed briefly at this point and explained more fully hereinafter in connection with the detailed description of the instant invention and selected prior art codes illustrated in the appended figures. One of the desired characteristics, of course, is that the encoding be such as to avoid undue bit shift. This is achieved by providing sufficient spacing between successive signal transitions recorded on the storage medium, but must not be done at the expense of reducing the recording density. Another desired characteristic of any encoding technique is that it avoid such large spacing between recorded signal transitions as would preclude the ability to achieve self-clocking during data recovery. Self-clocking is a feature whereby the encoded signal recorded on the storage medium and the related readout or reproduced signals possess such qualities as to provide the required control of the phase locked oscillator for data recovery as previously discussed. In the absence of a self-clocking capability, a separate clock channel must be provided on the recording medium and this is undesired, among other reasons, for the reason that it requires maintaining alignment of the read/write head of the clock channel relative to the heads associated with the data channels. The requirement, on the one hand, of sufficient minimum spacing between successive signal transitions so as to preclude undue bit shift and the requirement, on the other hand, for a limited maximum spacing between successive transitions so as to achieve self-clocking is essentially equivalent to the criterion that the number of recorded transitions per data bit be minimized or conversely that the number of data bits represented by each recorded transition be maximized.

The various encoding techniques commonly used in the present state of the art are generally deficient in one respect or another relative to the above indicated characteristics. So-called NRZ or NRZI codes, for instance, are characterized, in the case of a succession of several one or zero bits, by long intervals between recorded signal transitions thereby precluding self-clocking. Frequency modulation (FM) and phase modulation (PM) codes, on the other hand, while providing a self-clocking capability, are characterized by close spacing of the recorded signal transitions and thus limited in data packing density and timing tolerance as required to avoid undue bit shift and assure accurate data recovery. The close transition spacing of the FM and PM encoding techniques occurs because of the periodic insertion of clock transitions into the stream of data transitions for the express purpose of achieving self-clocking and thus these codes are degraded with respect to the desired criterion of minimizing the number of recorded transitions per data bit.

A more recently developed code known as modified frequency modulation (MFM) overcomes the limitations of the FM, PM and NRZ type codes to some extent and has in fact been in popular use for the past several years because of its self-clocking capability and the provision of substantially twice the packing density of the FM and PM codes without aggravating the bit shift problem or reducing timing tolerance. The MFM encoding technique does not employ additional clock transitions but instead uses the data transitions for clocking purposes and thus provides enhancement with respect to the criterion of minimizing the number of recorded transitions per data bit. Nevertheless, the binary data packing density which can be achieved with MFM code is limited by the minimum spacing which it provides between the successive signal transitions recorded on the storage medium. This limitation of the MFM code relative to the instant invention will be understood more fully from a reading of the subsequent detailed description of the presently preferred embodiment of the invention.

SUMMARY OF THE INVENTION

Accordingly, it is a principal object of the present invention to provide a new encoding and concomitant recovery technique which provides for self-clocking while simultaneously affording substantially a fifty percent or greater improvement in data packing density over present state of the art techniques without diminution of timing tolerance. Another principal object of the invention is to provide a new technique for encoding binary data which substantially increases the number of data bits represented by each transition of the encoded data signal relative to that attained with present state of the art encoding techniques.

The foregoing and other desired objectives and achieved in accordance with a presently preferred method for recording on a magnetic storage medium by dividing a binary data stream consisting of a sequence of one and zero bits, each occurring at an interval T, into respective data groups or words each containing three data bits. The respective data words are recorded in succession by representing each data word in turn, referred to herein as the present data word, by a code signal or combination of two code signals uniquely representative of the data word. The code signal or combination of code signals corresponds to a signal transition or combination of signal transitions which is recorded as a transition or combination of transitions respectively at a selected position or positions of only the first five or six uniformly spaced predetermined transition positions occurring sequentially in the order, P1, P2, P3, P4, P5, P6 on a specified segment of the magnetic storage medium, referred to as a data cell, having a length corresponding to three T intervals, the recording being such that combinations of transitions are recorded at positions having a prescribed minimum spacing therebetween equal to 1.5T.

Concurrently with the encoding of the present data word being recorded, a look ahead is made to the following or next data word to be recorded to determine whether it contains a bit pattern which, when encoded for recording, will produce a code signal corresponding to a transition at the position P1 in its data cell closest to the boundary of the present data cell. Under such condition, if the present binary data word is producing a code signal representative of a transition at the position P5, a transition will not be recorded at postion P5 in the present data cell but instead will be recorded at position P6 corresponding to the boundary between the present and following data cells.

Also concurrently with the encoding of the present data word, a look back is made to the preceding or previously recorded data word to ascertain whether it contained a bit pattern which, when encoded for recording, produced a code signal corresponding to a transition at position P5 which was replaced by a transition at P6. Under such condition, if the present data word relates to a code signal representative of a transition at P1, such transition is not recorded. The net result therefore is that, where adjacent data words relate to code signals representative of a transition at position P5 for one data word and a transition at position P1 for the immediately following data word, neither transition is recorded and both are effectively merged into or replaced by a single transition at the boundary between the data cells associated with the respective words.

Apparatus for carrying out the preferred encoding method comprises: a first shift register for storing the data bits in discrete storage locations for sequential encoding of respective data words; a first encoder and associated logic circuit coupled with the present data word to be encoded for providing a code signal or combination of code signals representative of the present data word; a second shift register for storing at discrete storage locations a transition signal or combination of transition signals corresponding respectively to the code signal or combination of code signals where the transition signals of combinations of transition signals are spaced a prescribed minimum number of storage locations and each transition signal corresponds to a transition position in a data cell occupying a given segment of a storage medium; a second encoder and associated logic circuit coupled with the following data word to be encoded for inhibiting storage in the second register of a transition signal corresponding to the transition position P5 in the present data cell adjacent the boundary of the following data cell and substituting in place of the inhibited transition signal another transition signal at transition position P6 located at the boundary of the present and following data cells, under the condition where the following data word relates to a code signal corresponding to a signal transition in its data cell at the transition position P1 adjacent the boundary of the present and following data cells; a third encoder and associated logic circuit coupled with the preceding data word for inhibiting storage in the second register of a transition signal corresponding to the transition position P1 in the present data cell adjacent the boundary of the preceding data cell, under the condition where the preceding data word relates to a code signal corresponding to a signal transition in its data cell at the transition position P5 adjacent the boundary of the present and preceding data cells; and clock signal generating means for appropriately stepping the shift registers to provide an encoded signal at the output of the second shift register suitable for application to data communications means or magnetic means.

It will be appreciated that the second and third encoders and associated logic circuits can be modified so that the second encoder and logic circuit acts to inhibit a code signal corresponding to a transition at position P5 in the present data cell adjacent the following data cell when the following data word relates to a code signal corresponding to a transition in its data cell at the position P1 adjacent the present data cell, while the third encoder and logic circuit acts to inhibit a code signal corresponding to a transition at position P1 in the present data cell adjacent the preceding data cell and simultaneously produces a signal at position P6' located at the boundary between the present and preceding data cells when the preceding data word relates to a code signal corresponding to a transition which was inhibited in its data cell at the position P5 adjacent the present data cell. It will also be appreciated that two transitions spaced less than the prescribed minimum amount could be replaced by or merged into one of such transitions at its original position and further that such transitions need not necessarily be disposed on opposite sides of a data cell boundary.

The invention further relates to a method and apparatus for recovering data encoded as described above. Briefly, the recovery apparatus comprises a read shift register for storing in respective positions thereof signals representative of the signals recorded in the present data cell being read out together with any signal recorded at the boundary of the present and preceding data cells in combination with logic circuit means coupled to the read shift register for producing the combination of bits of the present word as represented by the signals at the discrete locations of the shift register.

In a modification of the invention, the encoding procedure is adapted to reduce the maximum space between successive transitions in the encoded signal. Implementation of the modification requires a moderate number of additional circuit elements but provides such advantages as improved maintenance of a consistent and reliable clock rate, faster switching transient response in AC coupled read channel circuitry, reduced sensitivity to base line noise, reduced band width requirements on read circuitry, and reduced interference from adjacent magnetic tracks.

Accordingly another object is to provide an encoding/decoding system which assures substantial space between adjacent transitions and assures that the maximum time between adjacent transitions is not unduly long.

BRIEF DESCRIPTION OF THE DRAWINGS

FIG. 2 is a chart of properties of the prior art codes illustrated in FIG. 1 for a data bit rate of 1/T.

FIG. 3 is a chart of the properties of the code of the instant invention for a data bit rate of 1/T.

FIG. 4 is an illustration of a data cell of the instant invention showing the selective signal transition positions used in the invention code.

FIG. 5 depicts an illustrative binary data pattern and the related encoded signal waveform produced in accordance with the instant invention.

FIG. 7 is a truth table useful for obtaining an understanding of the encoding process of the invention.

FIG. 8 is a truth table for the circuit of FIG. 6.

FIG. 10 is a truth table for the circuit of FIG. 9.

FIGS. 11a and 11b are timing diagrams useful for understanding the operation of the circuits of FIGS. 6 and 9 respectively.

FIG. 13 is a table depicting another arrangement of code signal positions in accordance with the encoding technique of the instant invention wherein each data word corresponds to two successive data cells having three signal positions per cell.

FIG. 15 is a truth table for the circuit of FIG. 14.

FIG. 17 is a truth table for the circuit of FIG. 16.

DESCRIPTION OF THE PREFERRED EMBODIMENTS

Figure 1:
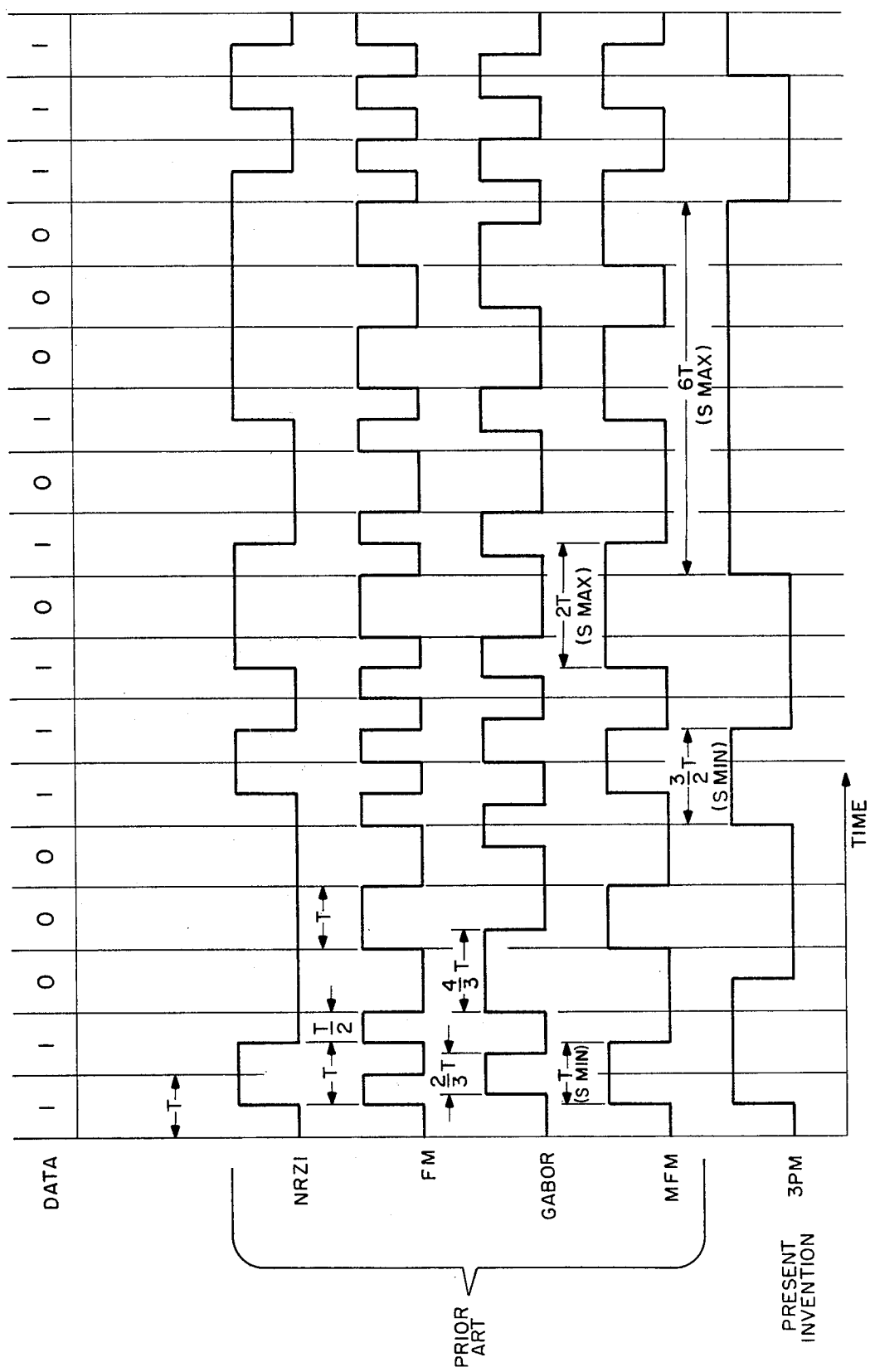
FIG. 1 depicts encoded signal waveforms illustrative of various prior art codes and the code of the instant invention with reference to common binary data occurring at a predetermined rate of 1/T.

An illustrative binary data pattern which will be used for describing the operation and features of the invention relative to prior art codes is shown in FIG. 1 wherein each data bit, represented by either a one or a zero, is indicated as occurring in an interval T with uniform spacing between the bits as is typically provided by a clock generator. The interval T is representative of a unit of time or a corresponding unit of length on a storage medium. The various prior art codes shown in FIG. 1, namely NRZI, FM, Gabor and MFM, each have the objective of encoding the binary data. It will be recognized that the various codes are all presented on a common scale corresponding to the indicated binary data rate. In the case of the NRZI code the binary data is encoded such that a signal change or transition occurs in the encoded waveform at the center of an interval T to represent a one bit whereas signal changes do not occur for the zero bits. FIG. 2 indicates various properties of the prior art codes shown in FIG. 1. The NRZI code has the advantage of a relatively wide recovery window (±0.5T) which obtains because of the fact that the closest adjacent signal transitions are spaced an amount equal to T. In other words, a transition gating pulse or socalled recovery window centered on each data bit interval and having a width of approximately ±0.5T will only detect a transition occurring in the associated interval. The NRZI code also has serious disadvantages, however, in that it is not capable of selfclocking and in addition has a very broad bandwidth as indicated by the ratio of S MAX to S MIN where S MIN and S MAX represent respectively the minimum and maximum distances between encoded signal transitions. This results because no signal change occurs in the case of a long sequence of zero bits. To obtain self-clocking, the spacing S MAX must not be too large because, as previously explained, the phase locked oscillator of the recovery system is controlled by the reproduced signal transitions. If the spacing S MAX exceeds a predetermined interval, the oscillator will run freely without clocking (synchronization) and as a result, the recovery window which is generated by the oscillator may not track the reproduced signal transitions as is required for recovering the binary data.

For the FM code a signal change or transition occurs in the encoded waveform at each boundary between adjacent data bit intervals T and at the center of each interval in which a one bit appears. Transitions occurring at the centers of the T intervals are data transitions while those occurring at the boundaries are clock transitions inserted specifically for assuring self-clocking, and since the maximum spacing between the signal changes is equal to T, self-clocking is easily achieved. Moreover, the system bandwidth is substantially reduced compared to the NRZI code as indicated by the ratio of S MAX to S MIN. The clock rate of 2/T indicates that a full cycle of the recovery window signal occurs in each interval T with one half cycle thereof required to be centered in the T interval in order to discriminate between data and clock transitions, and as a result, the recovery window for the FM code is reduced to half of that for the NRZI code. The reduction of S MIN has the adverse effect, as indicated in FIG. 2, of reducing the number of data bits encoded per S MIN, that is, per transition, to one-half of what can be obtained with the NRZI code.

The Gabor code, which is described in U.S. Pat. No. 3,374,475, High Density Recording System, issued Mar. 19, 1969 to A. Gabor as inventor, is characterized by encoded signal transitions occurring either at the T interval boundaries or the one-third and two-thirds positions between the boundaries. The Gabor code provides certain improvements over the FM code in that the number of data bits encoded per S MIN is increased and the recovery window is increased by virtue of increased minimum spacing between the signal transitions whereby the binary data packing density is increased relative to the FM code but not as much as is possible with NRZI code.

The MFM code is characterized by encoded signals either at the center or at the boundaries of the data bit intervals and therefore has the same clock rate as the FM code since a recovery window must be produced both at the center of each data bit interval T and at the boundaries of data bit intervals in order to detect all encoded signals for self-clocking purposes and to be able to discriminate between one and zero bits which are represented in the encoded signal by transitions occurring at unique locations, for example, ones at the centers of T intervals and zeros at the boundaries thereof. The MFM code affords the advantage relative to the Gabor code of increased data bits encoded per S MIN, in fact, being equal to the NRZI code as indicated in FIG. 2, while maintaining a suitable recovery window and S MAX so as to have a self-clocking capability. Further, because of the increased minimum spacing between the encoded signals, the binary data packing density obtainable with MFM code is better than what can be obtained with the FM or Gabor codes and in fact is substantially double that of the FM code. In other words, if T/2 is the acceptable minimum spacing between signal transitions for tolerable bit shift relative to the width of the recovery window, then the binary data may be presented for MFM encoding at a rate approximately double that which is permissible for the FM code, that is, the interval T of the binary data may be reduced to T/2 in the case of MFM encoding. It is recognized, therefore, that the MFM code possesses many desirable qualities for binary data encoding applications.

The method and means for implementing the present invention will be described shortly hereinafter but for the moment the salient features of the invention will be appreciated by reference to FIGS. 1 to 3. In accordance with the invention, a novel code, referred to as 3PM, (three position modulation or three phase modulation) is provided which further improves over the MFM code particularly with regard to the minimum spacing of signal transitions of the encoded waveform and the number of data bits encoded per minimum spacing between transitions as indicated by a comparison of FIG. 3 with FIG. 2. More specifically, in view of the increased minimum spacing between signal transitions, the binary data packing density is seen to be increased by fifty percent relative to MFM code. Thus, if T/2 is the minimum acceptable spacing between adjacent transitions, the 3PM code enables compression of the binary data by a factor of three relative to FM coding and by fifty percent relative to MFM coding. From FIG. 3 it will also be noted that the recovery window for the 3PM code is maintained equal to that for the MFM code; and although both S MAX and the ratio of S MAX to S MIN are increased, the parameters obtained are nevertheless satisfactory for self-clocking recovery with circuits presently available in the state of the art. Since transitions occur at both the midpoints and boundaries of T intervals for the 3PM code, the clock rate is 2/T corresponding to the clock rate for the FM and MFM codes. The foregoing features of the 3PM code are achieved by dividing the binary data into binary data words and encoding each data word such that it is represented by a signal transition or combination of signal transitions spaced at least a prescribed minimum amount and occurring in a data cell having a length equal to the sum of the number of intervals T corresponding to the number of bits in each data word. Generation of the code is further based on determining when signal transitions in one data cell are spaced less than the prescribed minimum spacing from signal transitions in an adjacent data cell and, in the event of such occurrence, providing for such closely spaced signal transitions to be replaced by a lesser number of transitions.

Figure 6:
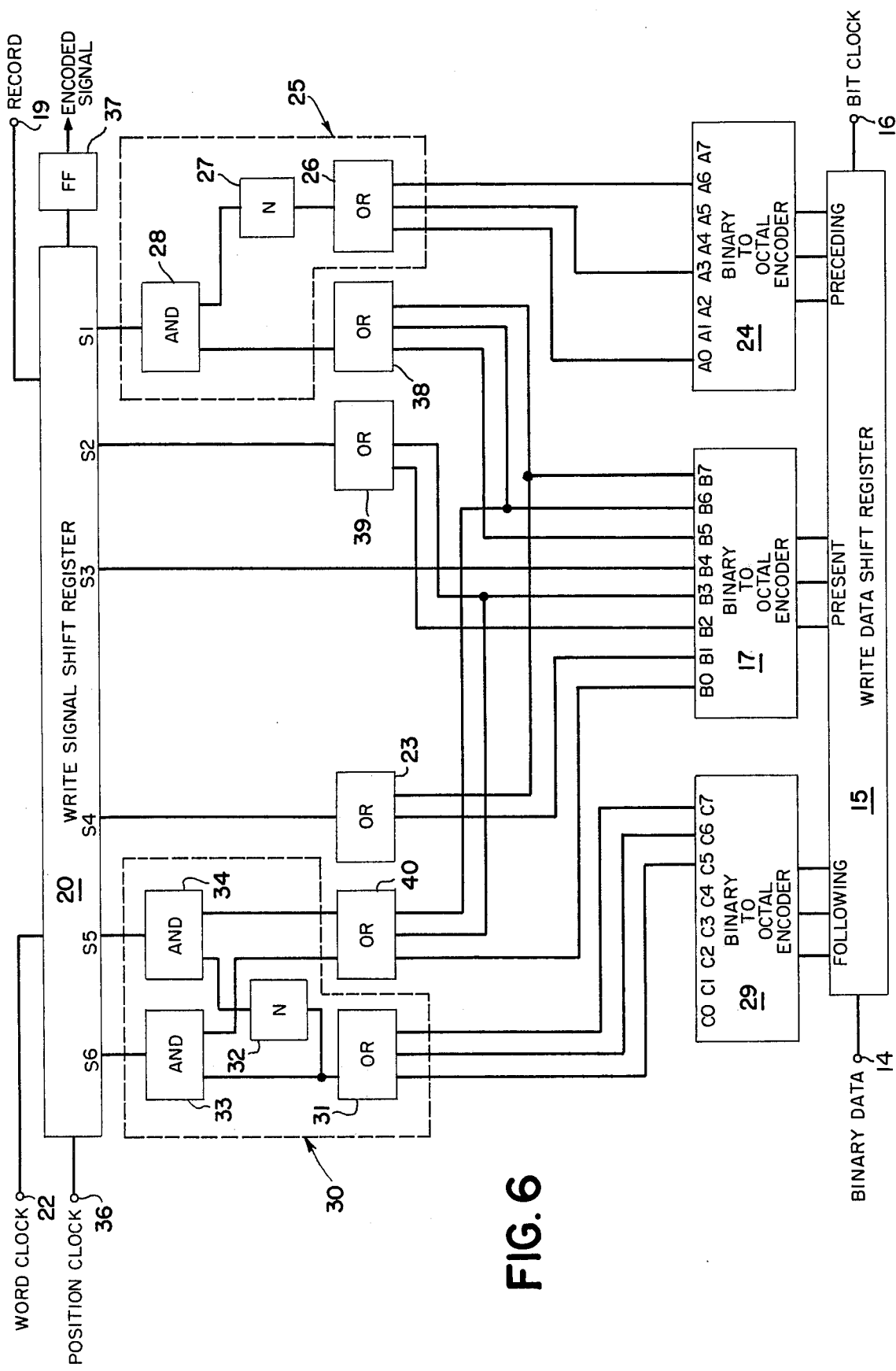
FIG. 6 is a circuit partially in block and partially in logic form for encoding data according to the instant invention.

The preferred encoding circuit, which is shown in FIG. 6 and will be discussed a little later, provides for dividing the binary data into sets of three data words with each data word including three data bits whereby each data word may be any one of eight possible data words, that is, each data word corresponds to one of the eight possible combinations of data bits in a word. Each data word in turn corresponds to either a single code signal or combination of code signals which relate respectively to a signal transition position in a data cell of the storage medium or a combination of signal transition positions in the data cell spaced from one another at least a prescribed minimum distance S MIN=3T/2 as indicated in FIG. 1. FIG. 4 indicates the location of the signal transition positions P1 through P6 which are equally spaced an amount T/2 relative to one another in a data cell which has a length equal to 3T for the case of three data bits per data word, the positions P6 being aligned with the boundaries of the data cell.

The third and fifth columns of FIG. 7, entitled respectively BINARY DATA WORD and TRANSITION POSITION IN DATA CELL, indicate the correlation of the eight possible data words with the six data cell transition positions. Other correlations of the data words and transition positions can be used, if desired, as long as the encoding criteria of the invention are satisfied in the manner as will now be explained. For the indicated correlations it will be noted that a single transition position is used for the binary data words 000, 001, 010, 100 and 101 whereas two signal transition positions are used for the binary data words 011, 110 and 111. It will also be noted that in those instances where two signal transitions are used, the transitions are spaced by at least three positions which from previous comments will be understood to be equal to 3T/2, the prescribed minimum spacing. It is apparent though that where transitions occur at position P5 in one data cell and at position P1 in an immediately following data cell, the spacing between transitions will only be an interval T and thus the prescribed minimum spacing will not be atained. Accordingly, it is provided that where such transitions are called for, they will in fact not be produced but instead will be replaced by a single transition at position P6 intermediate the inhibited transitions. More specifically, in a case where the present binary data word being encoded corresponds to a signal transition to be produced at position P5 in the present data cell and is followed by a binary data word associated with a signal transition to be produced at position P1 in the following data cell, the signal transition at position P5 in the present data cell will be inhibited and replaced by a signal transition at position P6 located at the trailing boundary of the present data cell. In addition, when the present binary data word being encoded corresponds to a signal transition to be produced at position P1 in the present data cell and was preceded by a binary data word associated with a signal transition to be produced at position P5 in the preceding data cell (and which, under the assumed conditions, was replaced by a transition at position P6), then the transition will be inhibited at position P1 in the present data cell. Thus, it is assured that encoding signals will not occur spaced less than the three positions apart. In other words, it is a rule of the invention encoding technique that a transition to be produced at position P5 in a present data cell followed by a signal transition to be produced at position P1 in the immediately following data cell will be merged into a single signal transition produced at the position P6 located at the boundary between the present and immediately following data cells. This is accomplished when encoding each binary data word in sequence by simultaneously looking at the immediately preceding and following data words as will be described more fully hereinafter with reference to FIGS. 6, 7 and 8. First though, attention is directed to FIG. 5 which depicts a binary data pattern and the related encoded signal produced in accordance with the encoding technique of the present invention.

As shown in FIG. 5, the first binary data word 001 produces a signal change or transition at position P4 in the first data cell Z1. The binary data word 111 of the secondary binary data group produces signal transitions at positions P1 and P4 in data cell Z2, the signal transition being made at position P1 in data cell Z2 since a signal transition did not occur at position P5 in the preceding data cell Z1. The third binary data word 010 produces a signal transition at position P2 in data cell Z3. The fourth binary data word 110 corresponds to signal transitions to be produced at positions P1 and P5 in data cell Z4, but only the signal transition at position P1 is actually produced. The signal transition at position P5 in data cell Z4 is inhibited because the following binary data word 101 is associated with a signal transition at position P1 in cell Z5. Thus, in accordance with the encoding rule of the invention, a signal transition is not made at position P5 in data cell Z4 but in place thereof a signal transition is made at position P6 coinciding with the boundary intermediate data cells Z4 and Z5. Further, since the signal transition at position P5 in data cell Z4 has been replaced by a signal transition at position P6, a signal transition is not made at position P1 in data cell Z5 corresponding to the binary data word 101.

Referring to FIGS. 6 and 11a, a signal representative of the binary data to be encoded is applied to data input terminal 14 of write data shift register 15 which has sufficient capacity for storing three binary data words each including three data bits and referred to hereafter, according to their instantaneous position in the register, as the present, preceding and following data words. The binary data signal may, for instance, comprise a series of pulses obtained by representing each one bit by a pulse and each zero bit by the absence of a pulse at discrete time increments. A series of bit clock pulses occurring at the data rate are applied to bit clock terminal 16 to shift the binary data one register stage in response to each such pulse. At this point it should be understood that a condition of no data in the register is equivalent to an absence of pulses in the respective register stages or, in other words, to a sequence of zero bits. Now it will be noted from FIG. 7 that the binary data word 000 corresponds to a signal transition at position P5. Thus, it will be assumed that encoding commences when the first binary data word to be encoded is aligned with binary to octal encoder 17. This condition obtains at the occurrence of the sixth bit clock pulse after the application of binary data to input terminal 14, namely, bit clock pulse 18a, at which time the three right side stages of register 15 have no data loaded in them. Consider more specifically the sequence of events commencing after the fifth bit clock pulse 18b, that is, after the first five data bits have been loaded into register 15. First, the record signal applied to record terminal 19 of write signal shift register 20 changes from a high level to a low level whereupon register 20 is enabled in readiness for signals to be loaded into its respective stages S1 through S6 which correspond respectively to positions P1 through P6 of a data cell. Actual loading of signals into the stages of register 20 does not occur, however, until the instant the leading edge of word clock pulse 21a applied to word clock terminal 22 changes from a high to a low level. This occurs at or slightly after the occurrence of the sixth bit clock pulse 18a at which time the sixth data bit is loaded into register 15 and the first data group to be encoded is aligned with binary to octal encoder 17. Thus, when the data word 001, referring to FIG. 5 for example, is the present binary data word which is to be encoded, a signal is supplied from the B1 terminal of encoder 17, as indicated in FIG. 7, and transmitted through OR gate 23 to stage S4 of register 20. The signal at the output of OR gate 23 is the code signal for the present data word 001. Simultaneously, the three zero bits in the preceding stages of register 15 aligned with binary to octal encoder 24 function through logic circuit 25 including OR gate 26, inverter 27 and AND gate 28 to inhibit storage of a signal in stage S1 of register 20 in the event a signal is being provided a terminal B5, B6 or B7 of encoder 17, but which, in fact, is not the case for the present binary data word 001. Also simultaneously, the following data word which, in this instance, is 111 and which is located in the following three stages of register 15 aligned with binary to octal encoder 29, functions through logic circuit 30 including OR gate 31, inverter 32 and AND gates 33 and 34 to inhibit storage of a signal at stage S5 and cause storage of a signal at stage S6 in the event a signal is being provided at terminal B0, B3 or B6 of encoder 17, but which again is not the case for the present binary data word 001. The net result therefore is that the data word 001 presently being encoded produces a signal in stage S4 of register 20 but not in any of the other stages of register 20. At the trailing edge of word clock pulse 21a further signal loading into stages S1 to S6 of register 20 is inhibited.

During the time between the trailing edge of word clock pulse 21a and the trailing edge of the next word clock pulse 21b, a total of six position clock pulses 35a through 35f occur at a rate twice that of the bit clock pulses and slightly leading the bit clock pulses in time. As each position clock pulse is applied to position clock terminal 36 of register 20, the contents of the respective register stages are shifted one stage. Thus, at the occurrence of position clock pulse 35a, the signal in register stage S1 is applied as an input trigger pulse to bistable flip flop 37, the signal in register stage S2 is shifted to stage S1 and so on with the signal in stage S6 being shifted to stage S5. For the assumed binary data word 001, only stage S4 contains a high level signal and therefore flip flop 37 does not switch state until the signal originally stored in stage S4 is applied to the flip flop input. This switching of state in flip flop 37 can be used to produce a magnetic flux transition in a magnetic storage medium as is well understood by those skilled in the art and as will be further explained subsequently with reference to FIG. 12. At the occurrence of the leading edge of position clock pulse 35f the signal originally stored in stage S6 is applied to the input of flip flop 37 and then shortly thereafter bit clock pulse 18e and word clock pulse 21b occur which causes new code signals to be applied to stages S1 to S6 of register 20 in view of the fact that the word clock signal is low again at this time as indicated by pulse 21b. It will be noted that during the time position clock pulses 35a to 35f have been occurring, bit clock pulses 18c to 18e also occur thereby causing the signals in register 15 to be shifted three positions with the result that the data bits originally in the preceding stages are shifted out of register 15, and the data bits originally in the present stages are now shifted into the preceding stages. Likewise, the data bits originally in the following stages are shifted into the present stages in readiness for encoding, and the next binary data group 010 (FIG. 5) is loaded into the following stages. The slight time lag of bit clock pulse 18e and word clock pulse 21b relative to position clock pulse 35f assures that the signals for one data word are transferred out of register 20 to flip flop 37 before the signals corresponding to the next data word are loaded into register 20.

As previously mentioned, the bit clock rate is equal to the data rate and the position clock rate is twice that of the bit clock rate. It should be understood and will be appreciated therefore that it is the position clock rate which determines the recording rate and associated minimum spacing between signal changes on the recording medium, hence, once a desired minimum spacing between signal transitions is established, the position clock rate must be suitably set in accordance with the relative speed between the recording medium and recording head and the bit clock rate then appropriately set to one-half the position clock rate.

Encoding of successive binary data words continues in the aforedescribed manner. Thus, with binary data word 111 in the present encoding stages of register 15, a signal is produced at terminal B7 of encoder 17, as indicated in FIG. 7, and transmitted through OR gates 23 and 38 to stages S1 and S4 of register 20. The signals at the outputs of OR gates 23 and 38 are the code signals for the data word 111. Likewise, with binary data word 010 in the present encoding stages of register 15, a signal is provided at terminal B2 of encoder 17 which in turn produces a code signal at the output of OR gate 39 coupled to stage S2 of register 20. Next, data word 110 provides a signal at terminal B6 of encoder 17 which in turn produces code signals at the outputs of OR gates 38 and 40 coupled respectively to stages S1 and S5 of register 20. In this instance, however, a signal is not loaded into stage S5 but instead a signal is loaded into stage S6 because of a signal supplied from encoder 29 and acting through logic circuit 30. More specifically, referring to FIG. 5, it is seen that the data word 101 follows the data word 110 presently being encoded. Since encoders 24 and 29 are identical to encoder 17, encoder 29 provides a signal at terminal C5 in response to the binary data word 101 applied to its input. The signal at terminal C5 is transmitted through OR gate 31 and inverter 32 to produce a low level signal at the input to AND gate 34 which inhibits passage of the signal supplied to AND gate 34 from encoder 17. At the same time, the signal supplied from terminal C5 is also transmitted to AND gate 33 where it combines with the high level signal derived from terminal B6 via OR gate 40 and thus loads a signal into stage S6 of register 20. This operation corresponds to the serial number twelve combination of FIG. 8. Finally, when the binary data word 101 reaches the present encoding stages of register 15, the binary data word 110 is shifted into the preceding stages and another word (not shown in FIG. 5) is loaded into the following stages of register 15. In this instance, encoder 17 provides a signal at terminal B5 which produces a code signal at the output of OR gate 38 coupled to AND gate 28 for loading a signal into stage S1 of register 20, but this action is inhibited by a signal provided at terminal A6 of encoder 24 in response to the binary data word 110 applied thereto. The signal at terminal A6 transmits through OR gate 26 and inverter 27 to produce a low level signal at the input of AND gate 28 to inhibit any signal passage therethrough. This operation corresponds to the serial number nine combination of FIG. 8. The actions of encoders 17, 24 and 29 and associated logic components of FIG. 6 for the various other possible combinations of binary data words in the present, preceding and following stages of register 15 are also indicated in FIG. 8.

Before proceeding to a discussion of the recovery apparatus it should be noted in FIG. 8 that the serial number nine, eleven, thirteen and fifteen combinations indicate instances in which a signal transition that was to be made at position P1 in a data cell was in fact not made because of a transition having been made at position P6 of the immediately preceding data cell. This is a significant feature which must be duly considered when recovering the binary data from the encoded signal as will become apparent from the ensuing description of the recovery apparatus.

Figure 9:
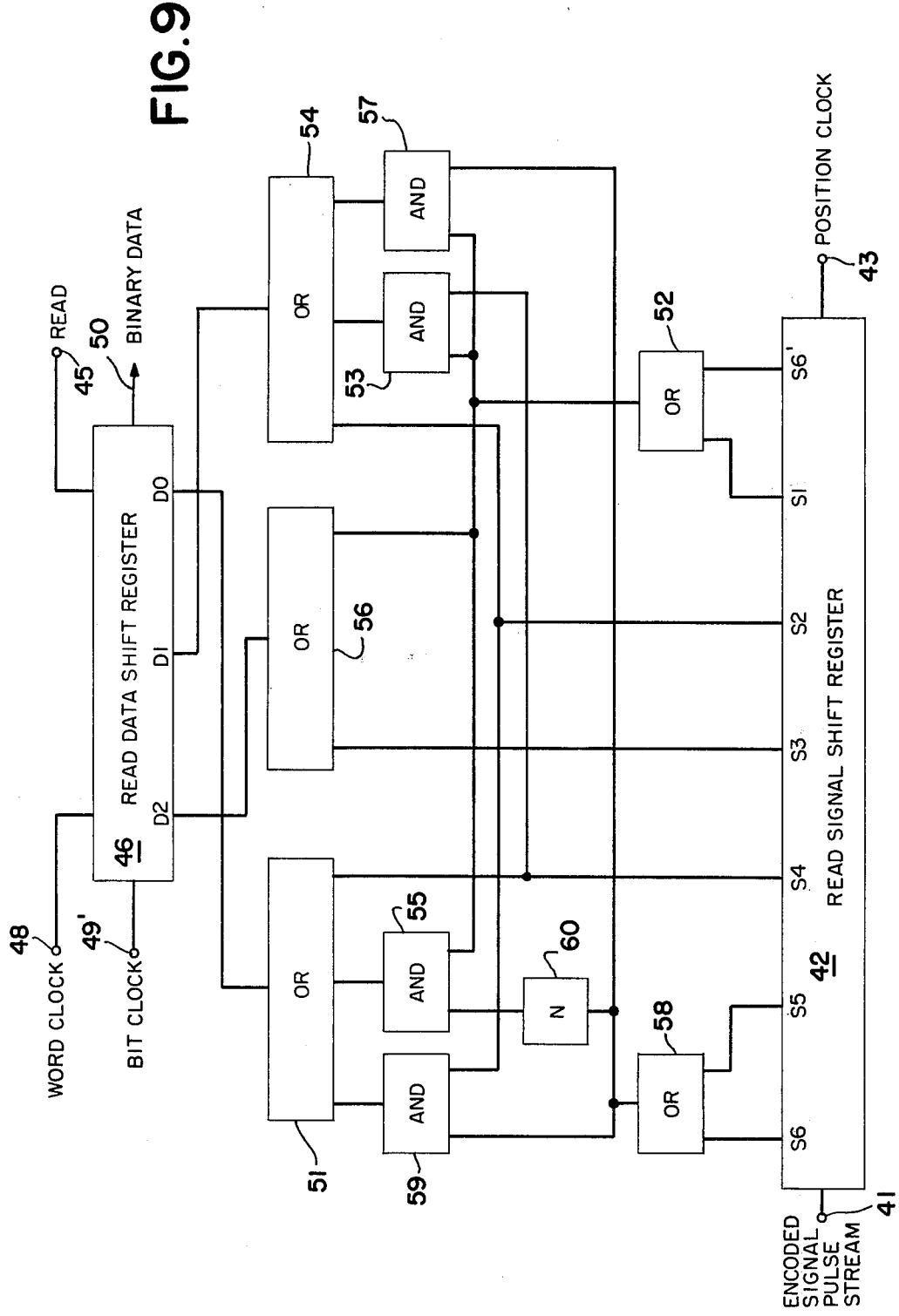
FIG. 9 is a circuit partially in block and partially in logic form for decoding data according to the instant invention.

Referring to FIGS. 9 and 11b, the reproduced encoded signal pulse stream from which the binary data is to be recovered is applied to input terminal 41 of read signal shift register 42. The reproduced encoded signal pulse stream is derived from the analog signal read from the magnetic storage medium on which the originally encoded signal, representative of binary data, was recorded in the form of a sequence of magnetic flux transitions each corresponding to a signal transition of the encoded signal and consists of a sequence of pulses each corresponding to a signal transition of the encoded signal. Position clock pulses applied to position clock terminal 43 of register 42 increment the encoded signal pulses through the register at the same rate at which the encoded signal transitions were produced during recording. Stages S1 to S6 of register 42 correspond respectively to positions P1 to P6 in each data cell of the recording medium and stage S6' corresponds to position P6 of the data cell immediately preceding the present data cell from which data is being recovered. The signals are read from the storage medium in the same order as recording or writing thereon and therefore, for the purpose of data recovery, a pulse corresponding to a transition recorded at the trailing boundary of the data cell preceding the present data cell is stored at stage S6' of register 42 while a transition recorded at the trailing boundary of the present data cell is recorded at stage S6 of register 42 in readiness for data recovery.

Referring again to FIG. 5, consider the recovery of the first binary data word which was recorded, namely 001. This word produced a signal transition at position P4 during the encoding and recording process, and now during recovery produces a high level signal at stage S4 and a low level signal at all the other stages of register 42 at completion of reading the first data cell of the storage medium, which occurs at position clock pulse 44a. Shortly before the occurrence of position clock pulse 44a, the read gate signal applied to read terminal 45 of read data shift register 46 changes from a high to a low level to enable the register for receiving signals at terminals D0, D1 and D2 which correspond to respective stages of register 46. The occurrence of the leading edge of word clock pulse 47a applied to word clock terminal 48 of register 46 causes the actual loading of signals at terminals D0, D1 and D2; and this occurs at or slightly after the leading edge of position clock pulse 44a. As in the case of recording, the bit clock pulse rate is half that of the position clock rate, and the bit clock pulses are delayed slightly with respect to the position clock pulses. Thus, at the occurrence of bit clock pulse 49a applied to bit clock terminal 49' of register 46, the signal in the stage associated with terminal D0 of register 46 is shifted out of the register onto binary data line 50 and the signals in the stages of D1 and D2 are likewise incremented one stage to the right. Word clock pulse 47a then changes back to a high level to inhibit further signal input to terminals D0, D1 and D2 and thereafter until the occurrence of word clock pulse 47b, bit clock pulses 49b and 49c respectively shift the original signals at the stages of terminals D1 and D2 out onto binary data line 50 while simultaneously position clock pulses 44b and 44g shift the encoded pulses corresponding to transitions of the following data cell into register 42.

The logic used for recovering the original binary data words from the pulses in register 42 will now be explained with reference to FIGS. 9 and 10. In the case of the first binary data word 001 which produced a pulse at stage S4 of register 42, a signal is applied through OR gate 51 to terminal D0. Since a pulse is not simultaneously produced at stage S1 or S6' of register 42, the signal level at the output of OR gate 52 is low and accordingly, the signal from stage S4 is inhibited from passing through AND gate 53 into OR gate 54. The result therefore of a pulse only in stage S4 of register 42 is an output of 001 on binary data line 50 as indicated by the serial number three combination of FIG. 10. The next binary data word 111 produces signals in stages S1 and S4 of register 42. The signal at stage 54 is again loaded into terminal D0 of register 46 via OR gate 51 and also to an input of AND gate 53 while the signal at S1 is transmitted through OR gate 52 and OR gate 56 to terminal D2 of register 46. The signal provided at the output of OR gate 52 is also applied to an input of AND gate 53 where it combines with the signal from stage S4 to provide a signal via OR gate 54 to terminal D1 of register 46. The net result is a signal stored in each stage of register 46 whereby the binary data word 111 is reproduced in response to the signals at stages S1 and S4 of register 42 as indicated by the serial number fourteen combination of FIG. 10.

A signal is stored at stage S2 of register 42 when the next binary data word 010 is being recovered. The signal at stage S2 is transmitted through OR gate 54 to terminal D1 of register 46, and no further decoding takes place during reading of this cell, so the data word 010 is readily reproduced on binary data line 50. The following binary data word 110 is represented by signals at stages S1 and S6 of register 42. The signal at stage S1 is transmitted through OR gate 52 to an input of AND gate 57 and through OR gate 56 to terminal D2 of register 46. Simultaneously, the signal at stage S6 is transmitted through OR gate 58 to an input of AND gate 59 and to the other input of AND gate 57 whereby a signal is applied through OR gate 54 to terminal D1 of register 46. Thus, the word 110 is provided on binary data line 50 in response to signals at stages S1 and S6 of register 42 as indicated by the serial number thirteen combination of FIG. 10. Finally when recovering the last binary data word 101, a signal is stored only in stage S6' of register 42. This is the same signal that was stored in stage S6 when recovering the preceding binary data word. The signal at stage S6' is transmitted through OR gate 52 to an input of AND gate 55 which simultaneously receives a high level signal at its other input from inverter 60 in view of the absence of a signal in stages S5 and S6 of register 42, whereby a signal is applied through OR gate 51 to terminal D0 of register 46. Thus, the signal at S6' of register 42 results in signals at the stages associated with terminals D0 and D2 of register 46 to provide the word 101 on binary data line 50 as indicated by the serial number nine combination of FIG. 10.

The binary data words recovered by the circuit of FIG. 9 in response to other signal combinations in the stages of register 42 are indicated in FIG. 10 which, it will be noted, corresponds to the encoding truth table of FIG. 8.

Some other features of the invention code, in addition to those previously mentioned, are of interest and can be appreciated at this point. Referring to FIG. 10, it is seen that a total of twenty-three ones representative of signal transitions are produced at various positions for all of the possible combinations. Sixteen of these ones (enclosed by dashed lines) occur in double windows, that is, either at positions P6' or P1 or at positions P5 or P6 which are redundant positions as indicated by the combinational logic which may be expressed in logic equation form as follows:

$$D0 = P4 + P2 \cdot (P5 + P6) + (P1 + P6') \cdot \overline{(P5 + P6)}$$

$$D1 = P2 + (P1 + P6') \cdot (P5 + P6) + (P1 + P6') \cdot P4$$

$$D2 = (P1 + P6') + P3$$

where a dot signifies AND, + signifies OR and a bar signifies NOT. Thus, approximately two-thirds of the transitions are positioned so as to alleviate timing tolerance. Further, the serial number five, six, ten, fourteen and fifteen combinations, for which the double window condition exists, are relatively more crowded than the other combinations in that only three or four position spaces exist between the ones of such combinations. A total of ten transitions exist under these relatively more crowded conditions and of this total, six or, again, approximately two-thirds occur in double windows thereby further alleviating timing tolerance.

Figure 12:
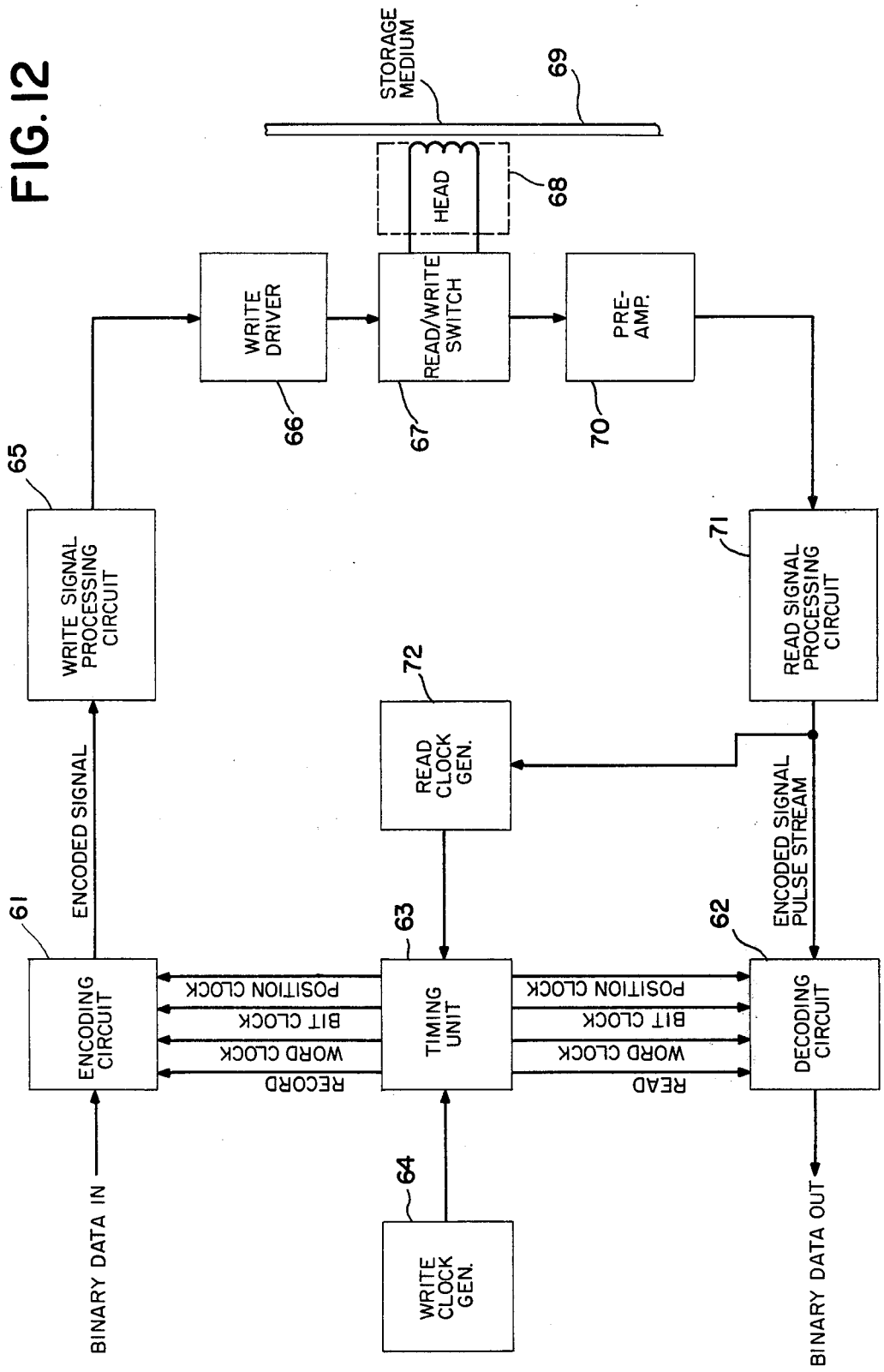
FIG. 12 is a recording and recovery system incorporating the circuits of FIGS. 6 and 9 for recording and recovering binary data encoded in accordance with the instant invention.

A data recording and recovery system incorporating the encoding and decoding circuits of FIG. 6 and FIG. 9 is shown in FIG. 12, where encoding circuit 61 corresponds to FIG. 6 and decoding circuit 62 corresponds to FIG. 9. The timing unit 63 provides the various clock signals and the record and read signals used respectively for data recoding and recovery. As previously mentioned with reference to FIGS. 11a and 11b, the position clock rate defines the data recording and reading rate. In the recording mode the position clock signal supplied from timing unit 63 is derived from a write clock generator 64 which may be a constant frequency crystal oscillator, for example, or an oscillator synchronized to the speed of the magnetic storage medium on which the data is to be recorded. The binary data to be recorded is applied to encoding circuit 61 which produces the 3PM encoded signal as hereinbefore explained. The encoded signal is then transmitted through write signal processing circuit 65, write driver 66 and read/write switch 67 to magnetic head 68 which records each signal transition of the encoded signal in the form of a corresponding magnetic flux transition on storage medium 69. Write signal processing circuit 65 may include signal processing circuits which cooperate with the write driver to enhance the quality of the magnetic recording.

In the recovery mode, magnetic head 68 produces a signal in response to each magnetic flux transition on storage medium 69 for transmission through preamplifier 70 and read signal processing circuit 71 to the input of decoding circuit 62. The signal supplied by the magnetic head is in analog form and includes positive and negative going portions representative of the successive flux transitions on the storage medium. Read signal processing circuit 71 functions to convert the analog signal to an encoded signal pulse stream wherein each pulse corresponds to a flux transition on the storage medium. The time of occurrence of the individual pulses of the encoded signal pulse stream is not identical with the signal transitions of the recorded encoded signal because of bit shift and other distortions inherent in the recording and recovery process. For this reason the encoded signal pluse stream is applied not only to decoding circuit 62 but also to read clock generator 72. The read clock generator may include, for example, a phase locked oscillator synchronized by the encoded signal pulse stream to run at a frequency that is a harmonic of the frequency corresponding to the period of minimum spacing between signal transitions, or more precisely, at a frequency equal to 2/T which is equivalent to the position clock rate. With the position clock rate thus being controlled by the encoded signal pulse stream, decoding circuit 62 operates in the aforedescribed manner to reproduce the original binary data at its output.

While the presently preferred embodiment of the invention has been described with reference to an encoding scheme in which each binary data word consists of three bits and is represented by signal transitions at one or two selected positions of a total of six positions in a data cell, it should be recognized that other logic configurations may be used within the ambit of the invention. For instance, each binary data word may be represented by a transition in one or both of two adjacent data cells each having a length equal to 1.5T and wherein each cell corresponds to one and a half binary data bits. An encoding scheme of this type is shown in FIG. 13. It will be noted that in this case the data cell boundaries coincide with the P3 signal transition positions. In order to maintain the desired minimum spacing of 3T/2 between signal transitions, the one bits at positions P2 and P1 of cell one and cell two respectively, corresponding to binary data word 100, will have to be merged into a transition at position P3 of cell one, that is at the boundary between cells one and two. Likewise, merging will be required in the case of binary data words 000, 011 and 110, for which a transition occurs at position P2 of cell two, when followed by any of the words 101, 110 or 111 for which a transition occurs at position P1 of cell one.

In addition to changing the data cell arrangement relative to a data word as explained in the preceding paragraph, it should be understood that other encoding circuit configurations may be used. For example, a write data shift register responding to a bit clock signal and having a capacity of only one data word may be used in combination with encoding and logic circuits means which is actuated by a word clock signal to receive the data word from the data shift register and generate the code signals which in turn are applied to a modulator comprising a modified shift register controlled by a multiphase clock signal for performing the merging feature of the invention together with the storing and shifting functions of the write signal shift register.

In the above described embodiment there can be a maximum of twelve positions between adjacent transitions. As indicated in FIG. 3, the maximum spacing (S MAX) for the embodiment previously described in 6T; by way of contrast the maximum spacing for the below described modification is 4.5T. For example, an octal five (101), preceded by a merger and followed by an octal zero (000), will be encoded, in accordance with the scheme shown in FIG. 8, with eleven consecutive positions without a transition. Although there are phase lock oscillators that can maintain synchronization over such period, better synchronization and consequent improved clock consistency and accuracy can be achieved by reducing the maximum spacing between adjacent transitions.

The decoding truth table of FIG. 10 indicates that no combination includes transitions at both $P_3$ and $P_6$ or $P_6'$ and $P_3$. Only one encoded signal, an octal four, records a transition at $P_3$ but not in combination with either $P_6'$ or $P_6$. $P_6'$, $P_3$ and $P_6$ are strategic locations in the modification of the invention because insertion of a transition at an appropriate combination of such strategic positions assures that a transition will occur at least every ninth position and the data will be encoded and decoded unambiguously. The combinations $P_3$, $P_6$ and $P_6'$, $P_3$ are unique in that no combination of other data patterns, after performing the merging rules described above, will result in transitions at such positions.

Figure 14:
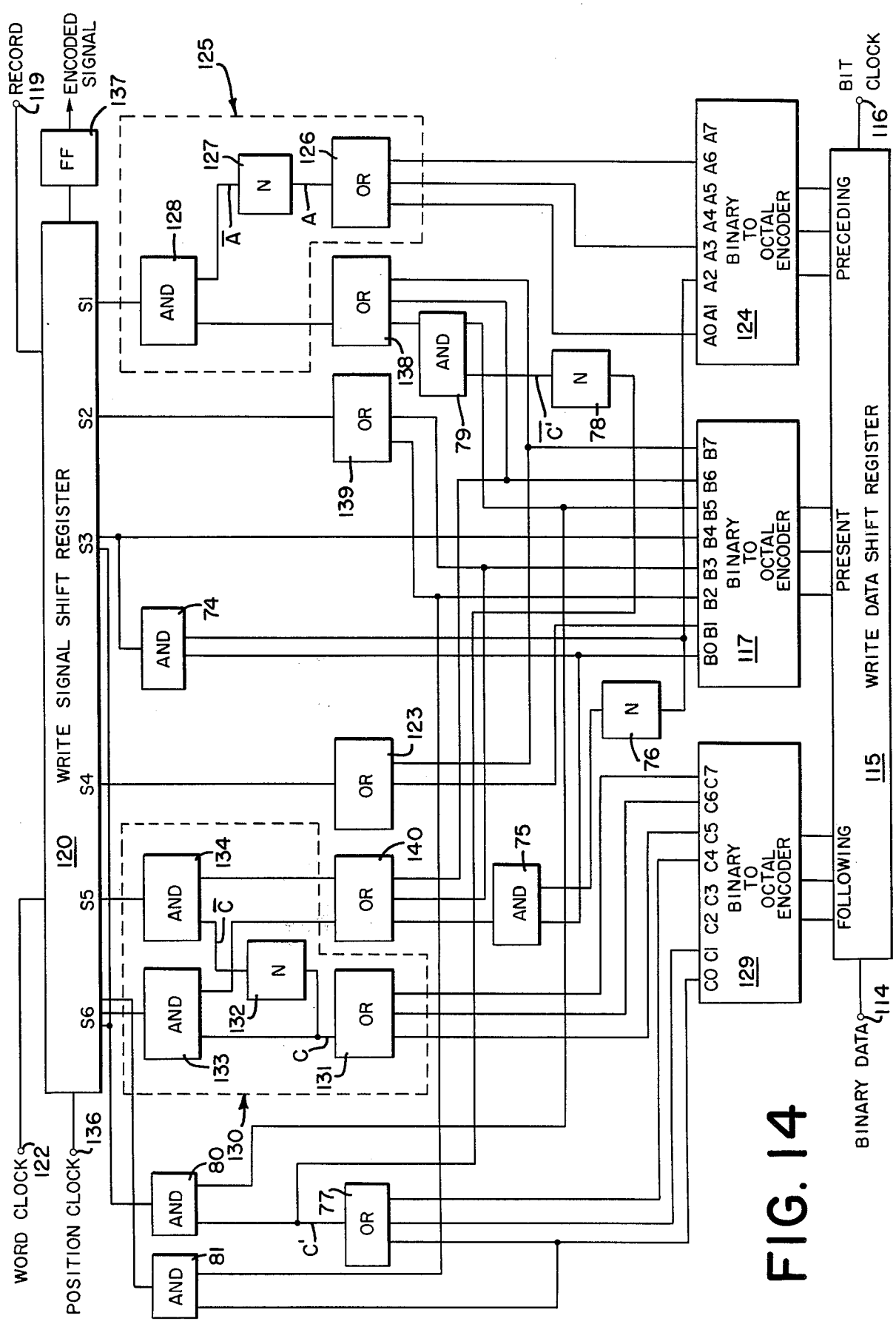
FIG. 14 is a circuit partially in block and partially in logic form for encoding data according to a modification of the invention.

The encoding rules to achieve the foregoing, which are implemented by the circuit of FIG. 14, can be appreciated by the encoding of the following four sequences:

| Octal: | $P_1$ | $P_2$ | $P_3$ | $P_4$ | $P_5$ | $P_6$ | $P_1$ | $P_2$ | $P_3$ | $P_4$ | $P_5$ | $P_6$ |
|---|---|---|---|---|---|---|---|---|---|---|---|---|
| 51 | 0 | 0 | 1 | 0 | 0 | 1 | 0 | 0 | 0 | 1 | 0 | 0 |
| 50 | 0 | 0 | 1 | 0 | 0 | 1 | 0 | 0 | 0 | 0 | 1 | 0 |
| 20 | 0 | 1 | 0 | 0 | 0 | 1 | 0 | 0 | 1 | 0 | 0 | 0 |
| 54 | 0 | 0 | 1 | 0 | 0 | 1 | 0 | 0 | 1 | 0 | 0 | 0 |

It will be noted that a minimum of at least two positions without a transition between every pair of adjacent transitions is maintained, and that in no case will there be more than eight positions without a transition between any adjacent pair of transitions. After application of the insertion rules implied by the above table, merging is carried out where required. For example, if the octal combination five-zero is followed by an octal six, the transition at $P_5$ of the encoded zero would be shifted to $P_6$.

The encoding circuit of FIG. 14 affords reduction in the maximum time between two adjacent transitions to nine positions. In FIG. 14, elements that are equivalent to those present in the circuit of FIG. 6 are identified by reference numerals greater by 100 than the corresponding elements in FIG. 6. The elements so identified in FIG. 14 are interconnected and function as described previously in connection with FIG. 6. Additionally, there is an AND gate 74 having an output connected to terminal S3 of shift register 20 and inputs constituted by the B0 output of encoder 17 and the A2 output of encoder 24. There is an AND gate 75 having its output connected as one input to OR gate 140. The inputs to AND gate 75 are constituted by output terminal B0 of encoder 117 and the output of an inverter 76 which has its input connected to output terminal A2 of encoder 124. There is an OR gate 77 having three inputs connected respectively to output terminals C0, C1 and C4 of encoder 129. In FIGS. 14 and 15 the output of OR gate 77 is identified as C'. The logic signal C' is inverted by an inverter 78, the output of which forms one input to an AND gate 79. The other input to AND gate 79 is constituted by output B5 of encoder 117. The output of AND gate 79 is connected as one input to OR gate 138.

Output C' of OR gate 77 also constitutes one input to an AND gate 80, the other input to the AND gate being signal B5 from encoder 117. The output of AND gate 80 is connected to terminals S3 and S6 of shift register 120. Finally, there is an AND gate 81 having its output connected to terminal S6 of shift register 120 and two inputs, one connected to signal C0 from encoder 129 and the other connected to signal B2 of encoder 117.

In operation the encoding circuit of FIG. 14 is similar in many respects to the operation of FIG. 6. Binary data are applied serially to input 114 of shift register 115. Such data are encoded by encoders 117, 124 and 129 to provide signals indicative of a present word, a preceding word and a following word, respectively. Such signals are gated by the circuitry shown in FIG. 14 to apply appropriate parallel inputs to terminals S1–S6 of write shift register 120 to effect the encoding shown in the truth table of FIG. 15. The encoded signal is serially outputted from the right hand side of shift register 120 in the manner previously described. The minimum and maximum space between transitions in the encoded signal are as described above so that both undue pulse crowding and excessive time without a transition are avoided.

Figure 16:
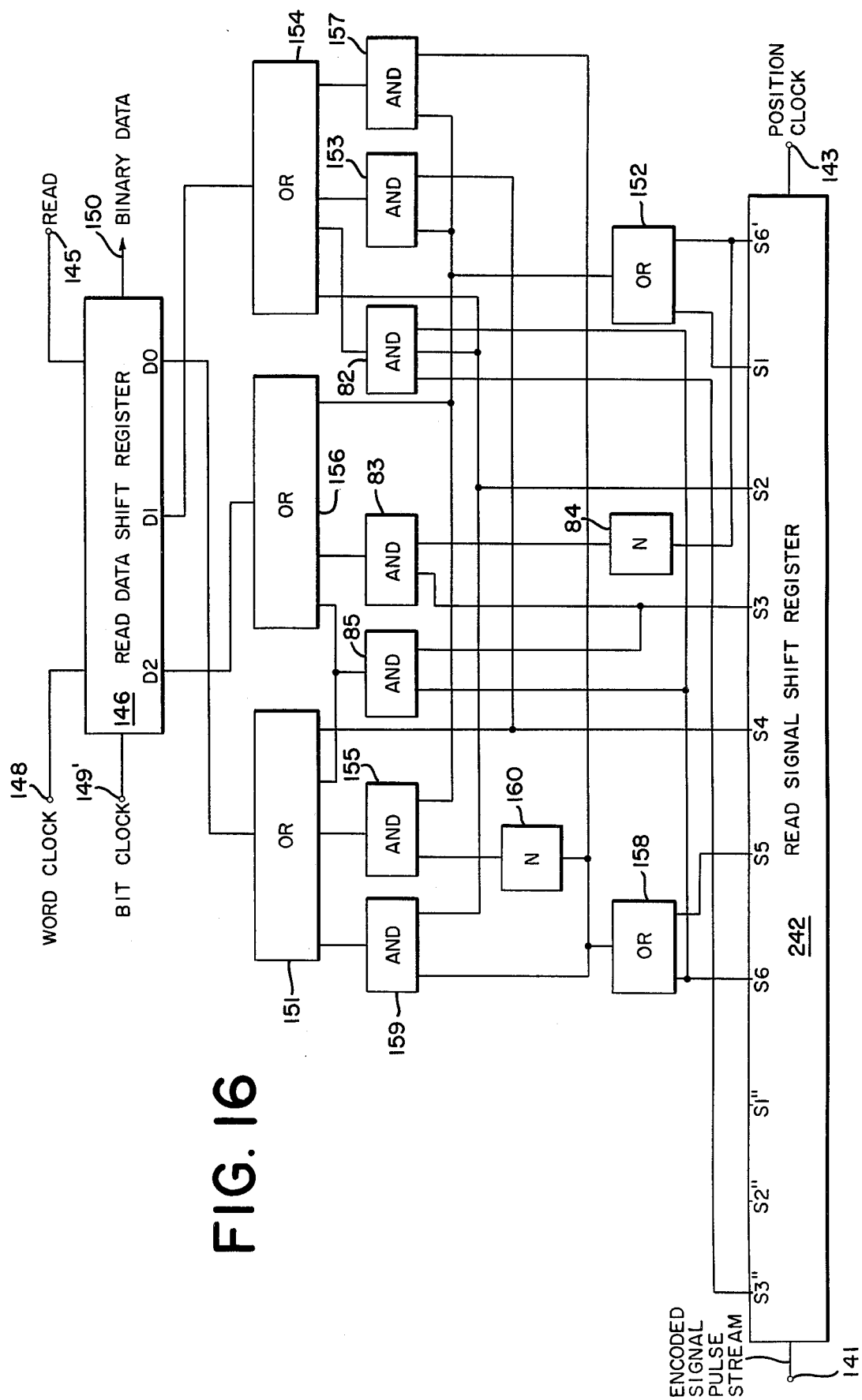
FIG. 16 is a circuit partially in block and partially in logic form for decoding data according to the modification of the invention that employs the encoding circuit of FIG. 14.

The decoding circuitry shown in FIG. 16 has many elements that are common to the decoding circuit previously described in connection with FIG. 9. The elements in FIG. 16 that are similar in structure and function to the elements in FIG. 9 are identified in FIG. 16 by reference numerals greater by 100 than corresponding elements in FIG. 9. In the circuit of FIG. 16 there is a read signal shift register 242 which has somewhat greater capacity than shift register 42 in FIG. 9 because it is essential for unambiguous decoding to determine whether a transition occurs at position $P_3''$ in the following word. Accordingly, shift register 242 has additional capacity to produce a signal $S_3''$ which indicates whether there is a transition in position $P_3''$ of the following word. Such signal is connected as one input to an AND gate 82. AND gate 82 also has inputs from shift register outputs S2 and S6. The output of AND gate 82 is connected as an additional input to OR gate 154. There is also an AND gate 83 having one input connected to terminal S3 of shift register 242 and a second input connected through an inverter 84 from shift register terminal S6'. The output of AND gate 83 is connected as an additional input to OR gate 156. Finally, there is an AND gate 85 having its output connected to OR gates 151 and 156 and its inputs constituted by signals S3 and S6 from shift register 242.

The operation of the decoding circuit of FIG. 16 is similar to that of FIG. 9 except for the encoded sequences set forth in the lower three rows of FIG. 17. As indicated in FIG. 17, sequences representative of octal numbers 0, 2 and 5 are different in certain instances from those used in the decoding scheme employing the merger techniques previously described. As can be seen from FIG. 15 there are never more than eight successive positions lacking a transition, such being a worst case and occurring for example when the signal identified by serial number 7 (octal 4) is followed by a signal identified by serial number 2 (octal 0).

Thus it will be seen that the modification described hereinabove in conjunction with FIGS. 14-17 affords the advantages of signal merger to assure at least two positions between adjacent transitions and, in addition, limits the number of positions without transitions to eight. This achieves the advantages heretofore described.

While the invention has been described in detail with reference to specific embodiments, it will be apparent that improvements and modifications may be made within the purview of the invention without departing from the true spirit and scope thereof as defined in the appended claims.

What is claimed is:

1. Apparatus for converting binary data in the form of a series of data bits occurring at spaced intervals to a series of signal changes each located at a discrete selected signal change position of a plurality of signal change positions that are spaced from one another by an increment such that the selected signal change positions are spaced relative to one another at least a prescribed minimum amount greater than the increment, said apparatus comprising: data storage means for receiving the binary data and grouping data bits to form a plurality of data words, code signal generating means coupled to the data storage means and responsive to the data words for generating code signals each of which corresponds to a signal change, and means coupled to said code signal generating means and responsive to code signals generated thereby for merging plural code signals that correspond to signal changes at divers signal change positions spaced from one another less than the prescribed minimum amount into at least one code signal corresponding to a signal change at a signal change position different from said divers signal change positions such that all signal changes are spaced from one another by at least the prescribed minimum amount.

2. The apparatus of claim 1 in combination with means responsive to said code signal generating means for inserting an inserted signal change at a signal change position so that said inserted signal change position is spaced relative to all other signal change positions by at least the prescribed minimum amount.

3. The apparatus of claim 1 wherein the means for merging code signals is responsive to code signals corresponding to signal changes at positions spaced less than the prescribed minimum amount.

4. The apparatus of claim 3 further comprising code signal storage means coupled to receive and store code signals corresponding to signal changes at signal change positions spaced at least the prescribed minimum amount.

5. The apparatus of claim 4 comprising clock signal generating means coupled to drive the data storage means and the code signal storage means at predetermined rates for sequentially applying the data words to the code signal generating means and reading out the code signals stored in said code signal storage means.

6. The apparatus of claim 5 further comprising magnetic recording means including a magnetic recording head coupled to the code signal storage means and disposed in recording relation with a magnetic recording medium for recording successive signal changes as residual magnetic flux patterns on said magnetic recording medium.

7. The apparatus of claim 1 wherein the plurality of signal change positions relate to a plurality of data cells, and each data cell includes a predetermined number of signal change positions.

8. The apparatus of claim 7 wherein each code signal produced by the merging of code signals corresponds to a signal change at a signal change position proximate the signal change positions related to the merged code signals.

9. The apparatus of claim 7 wherein each code signal produced by the merging of code signals corresponds to a signal change at a signal change position intermediate the signal change positions related to the merged code signals.

10. The apparatus of claim 7 wherein at least one signal change position in each data cell relates to a signal change corresponding to a code signal produced by the merging of code signals.

11. The apparatus of claim 10 wherein the merged code signals include a code signal associated with one data cell and a code signal associated with an adjacent data cell, and the code signal associated with said one data cell and the code signal associated with said adjacent data cell each correspond to a signal change at a signal change position adjacent the boundary between said one data cell and said adjacent data cell.

12. The apparatus of claim 7 wherein one signal change position in each data cell relates exclusively to a signal change corresponding to a code signal produced by the merging of code signals and is located at the boundary of adjoining data cells, and the merged code signals produce a code signal corresponding to a signal change located at a signal change position at the boundary of the adjoining data cells.

13. The apparatus of claim 4 wherein the plurality of data words correspond to a plurality of data cells, and each data word corresponds to a discrete data cell including a predetermined number of signal change positions and is represented by one or more signal changes in its data cell.

14. The apparatus of claim 12 wherein at least one of the signal change positions in each data cell relates to a signal change corresponding to a code signal resulting from the merging of code signals spaced less than the prescribed minimum amount.

15. The apparatus of claim 14 wherein the code signal generating means comprises encoding means coupled to the data storage means for providing code signals representative of the data words, and logic circuit means coupled to the encoding means for processing the code signals.

16. The apparatus of claim 15 wherein the encoding means and logic circuit means comprises a first encoder and associated logic circuit for providing a code signal or combination of code signals representative of the present data word being encoded, a second encoder and associated logic circuit operatively related with the data word following the present data word for inhibiting a code signal of the present data word corresponding to a signal change at the signal change position in the present data cell adjacent the boundary of the present and following data cells when the following data word relates to a code signal corresponding to a signal change in its data cell at the signal change position adjacent the boundary of the present and following data cells, a third encoder and associated logic circuit operatively related with the data word preceding the present data word for inhibiting a code signal corresponding to a signal change at the signal change position in the present data cell adjacent the boundary of the preceding and present data cells when the preceding data word relates to a code signal corresponding to a signal change inhibited in its data cell at the signal change position adjacent the boundary of the present and preceding data cells, and means for generating a code signal corresponding to a signal change at the signal change position located at the boundary of said present and following data cells.

17. The apparatus of claim 16 wherein each data cell has a length equal to the number of data bit intervals associated with the data bits in a word.

18. The apparatus of claim 17 wherein each data word includes three data bits.

19. The apparatus of claim 18 wherein each data cell includes six signal change positions and one of said six signal change positions coincides with a boundary of the data cell.

20. Apparatus for recovering binary data from an encoded signal in which the binary data is represented by signal changes occurring approximately at selected positions of a plurality of spaced positions, said binary data comprising a sequence of data words each corresponding to a discrete data cell of a plurality of data cells and a predetermined number of spaced positions being located in each data cell such that one of said positions coincides with a boundary of the data cell, and wherein a signal change at a boundary of a data cell is representative of a signal related to the two data words corresponding to the data cells adjacent said boundary, said apparatus comprising: means for simultaneously storing one or more signals representative of the signal changes occurring in a data cell and any signal representative of a signal change occurring at the boundary of an adjoining data cell, and means for decoding the stored signals to produce code signals from which the data words may be reproduced, said decoding means converting a signal change at a boundary between two data cells to at least one signal change position in each of the two data cells that define the boundary.

21. The apparatus of claim 20 wherein the signal change at the boundary is associated with a code signal in each of the two data cells at the position therein adjacent the boundary.

22. A method of converting binary data including a series of data bits occurring at spaced intervals to a series of signal changes each located at a discrete selected signal change position of a plurality of signal change positions that are spaced from one another by an increment such that the selected signal change positions are spaced relative to one another at least a prescribed minimum amount greater than the increment, said method comprising the steps of: receiving the binary data and grouping the data bits to form a plurality of data words, generating code signals representative of the data words, each code signal corresponding to a signal change, and merging plural code signals that correspond to signal changes at divers signal change positions spaced from one another less than the prescribed minimum amount into at least one code signal corresponding to a signal change at a signal change position different from the divers signal change positions such that all signal changes are spaced from one another by at least the prescribed minimum amount.

23. The method of claim 22 comprising the further step of storing code signals corresponding to signal changes at signal change positions spaced at least the prescribed minimum amount.

24. The method of claim 23 comprising the further step of clocking the data bits and stored code signals at predetermined rates for sequentially generating code signals representative of the data words and reading out the stored code signals representative of signal changes.

25. The method of claim 24 comprising the further step of recording successive signal changes as residual magnetic flux patterns on a magnetic recording medium.

26. The method of claim 22 wherein the plurality of signal change positions relate to a plurality of data cells, and each data cell includes a predetermined number of signal change positions.

27. The method of claim 26 wherein a code signal produced by the merging of code signals corresponds to a signal change at a signal change position proximate the signal change positions related to the merged code signals.

28. The method of claim 26 wherein a signal produced by the merging of code signals corresponds to a signal change at a signal change position intermediate the signal change positions related to the merged code signals.

29. The method of claim 26 wherein at least one signal change position in each data cell relates to a signal change corresponding to a code signal produced by the merging of code signals.

30. The method of claim 29 wherein the merged code signals include a code signal associated with one data cell and a code signal associated with an adjacent data cell, and the code signal associated with said one data cell and the code signal associated with said adjacent data cell each correspond to a signal change at a signal change position adjacent the boundary between said one data cell and said adjacent data cell.

31. The method of claim 26 wherein one signal change position in each data cell relates exclusively to a signal change corresponding to a code signal produced by the merging of code signals and is located at the boundary of adjoining data cells, and the merged code signals produced a code signal corresponding to a signal change located at a signal change position at the boundary of the adjoining data cells.

32. The method of claim 23 wherein the plurality of data words correspond to a plurality of data cells, and each data word corresponds to a discrete data cell including a predetermined number of signal change positions and is represented by one or more signal changes in its data cell.

33. The method of claim 32 wherein at least one of the signal change positions in each data cell relates to a signal change corresponding to a code signal resulting from the merging of code signals spaced less than the prescribed minimum amount.

34. The method of claim 33 wherein the steps of generating code signals and merging code signals are performed by providing a code signal or combination of code signals representative of the present data word being encoded, inhibiting a code signal of the present data word corresponding to a signal change at the signal change position in the present data cell adjacent the boundary of the present and following data cells when the following data word relates to a code signal corresponding to a signal change in its data cell at the signal change position adjacent the boundary of the present and following data cells, inhibiting a code signal corresponding to a signal change at the signal change position in the present data cell adjacent the boundary of the preceding and present data cells when the preceding data word relates to a code signal corresponding to a signal change inhibited in its data cell at the signal change position adjacent the boundary of the present and preceding data cells, and generating a code signal corresponding to a signal change at the signal change position located at the boundary of said present and following data cells.

35. The method of claim 34 wherein each data cell has a length equal to the number of data bit intervals associated with the data bits in a word.

36. The method of claim 34 wherein each data word includes three data bits.

37. The method of claim 36 wherein each data cell includes six signal change positions and one of said six signal change positions coincides with a boundary of the data cell.

38. The method of claim 37 comprising the further step of clocking the data bits and stored code signals at predetermined rates for sequentially generating code signals representative of the data words and reading out the stored code signals representative of signal changes and wherein the data bits are clocked at one-half the rate at which the signals representative of signal changes are clocked.

39. A method of recovering binary data from an encoded signal in which the binary data is represented by signal changes occurring approximately at selected positions of a plurality of spaced positions, said binary data comprising a sequence of data words each corresponding to a discrete data cell of a plurality of data cells and a predetermined number of spaced positions being located in each data cell such that one of said positions coincides with a boundary of the data cell, and wherein a signal change at a boundary of data cell is representative of a signal related to the two data words corresponding to the data cells adjacent said boundary, said method comprising the steps of: simultaneously storing one or more signals representative of the signal changes occurring in a data cell and any signal representative of a signal change occurring at the boundary of an adjoining data cell, and decoding the stored signals to produce code signals from which the data words may be reproduced, said decoding step including the step of converting a signal change at a boundary between two data cells to at least one signal change position in each of the two data cells that define the boundary.

40. The method of claim 39 wherein the signal change at the boundary is associated with a code signal in each of the two data cells at the position therein adjacent the boundary.

* * * * *